US00RE37991E

(19) United States
(12) Reissued Patent
Legate

(10) Patent Number: US RE37,991 E
(45) Date of Reissued Patent: Feb. 18, 2003

(54) APPARATUS FOR TRACKING THE FLOW OF VIDEO SIGNALS BY INCORPORTATING PATTERNS OF MACHINE READABLE SIGNALS WHICH WILL APPEAR AT PREDETERMINED LOCATIONS OF A TELEVISION PICTURE

(75) Inventor: Kim R. Legate, Valencia, CA (US)

(73) Assignee: Visual Automation Systems, Inc., Wentzville, MO (US)

(21) Appl. No.: 09/154,389

(22) Filed: Sep. 16, 1998

Related U.S. Patent Documents

Reissue of:
(64) Patent No.: 5,557,334
Issued: Sep. 17, 1996
Appl. No.: 08/388,422
Filed: Feb. 14, 1995

U.S. Applications:
(63) Continuation-in-part of application No. 08/003,481, filed on Jan. 12, 1993, now Pat. No. 5,450,134.

(51) Int. Cl.[7] ..... H04N 7/087
(52) U.S. Cl. ..... 348/473; 348/460; 348/467
(58) Field of Search ..... 348/460, 461, 348/463, 465, 466, 467, 722, 723, 727, 907, 578, 589, 476, 477, 569, 577, 182, 183; 725/9, 19, 20

(56) References Cited

U.S. PATENT DOCUMENTS 3,507,985 A * 4/1970 Breukink et al. ..... 348/473
3,659,285 A * 4/1972 Baer et al. ..... 463/3
3,848,082 A * 11/1974 Summers ..... 345/765
3,900,887 A * 8/1975 Soga et al. ..... 348/479
4,230,990 A * 10/1980 Lert et al. ..... 348/473
4,368,486 A * 1/1983 Degoulet et al. ..... 348/461
4,805,020 A * 2/1989 Greenberg ..... 348/460
4,807,031 A * 2/1989 Broughton et al. ..... 348/460
4,846,693 A * 7/1989 Baer ..... 434/308
4,855,827 A * 8/1989 Best ..... 348/473
4,857,999 A * 8/1989 Welsh ..... 725/20
4,890,319 A * 12/1989 Seth-Smith et al. ..... 380/5
4,931,871 A * 6/1990 Kramer ..... 348/460
4,969,041 A 11/1990 O'Grady et al.
5,019,899 A * 5/1991 Boles et al. ..... 348/184
5,063,493 A * 11/1991 Shioiri et al. ..... 369/83
5,063,523 A * 11/1991 Vrenjak ..... 709/223
5,099,319 A * 3/1992 Esch et al. ..... 348/722
5,133,022 A * 7/1992 Weideman ..... 358/447

(List continued on next page.)

FOREIGN PATENT DOCUMENTS

JP 4188964 A * 7/1992

*Primary Examiner*—John W. Miller
*Assistant Examiner*—Linus H Lo
(74) *Attorney, Agent, or Firm*—Kramer Levin Naftalis & Frankel LLP; Gregor N. Neff, Esq.

(57) ABSTRACT

Method and apparatus for encoding and decoding video signals for identification, editing, modifying, cuing, routing, distributing, switching, activating and controlling the video signals. One of the many applications is a television program distribution system including a plurality of units through which the television programs flow, by operating a first signal processing unit connected within the system for adding signal elements to the video signal of a program in order to add patterns of symbols to the television picture such that the symbols are disposed at predetermined locations of the television picture and a plurality of successive patterns constituting a code uniquely identifying the program; and a second signal processing unit connected within the system for detecting signal elements previously added to a video signal and for producing, in response to such detection, an identification of the program which included the video signal.

37 Claims, 13 Drawing Sheets

U.S. PATENT DOCUMENTS 5,200,822 A * 4/1993 Bronfin et al. ..... 348/473
5,226,160 A * 7/1993 Waldron et al. ..... 395/560
5,319,453 A * 6/1994 Copriviza et al. ..... 348/473
5,321,514 A * 6/1994 Martinez ..... 348/723
5,412,416 A * 5/1995 Nemirofsky ..... 725/36
5,450,134 A * 9/1995 Legate ..... 348/467
5,453,794 A * 9/1995 Ezaki ..... 348/461
5,557,334 A * 9/1996 Legate ..... 348/473
5,646,675 A * 7/1997 Copriviza et al. ..... 725/22
5,748,763 A 5/1998 Rhoads
5,808,689 A * 9/1998 Small ..... 348/476
5,929,920 A 7/1999 Sizer, II
6,040,870 A * 3/2000 Small ..... 348/476
6,125,172 A 9/2000 August
6,266,430 B1 7/2001 Rhoads

* cited by examiner

APPARATUS FOR TRACKING THE FLOW OF VIDEO SIGNALS BY INCORPORTATING PATTERNS OF MACHINE READABLE SIGNALS WHICH WILL APPEAR AT PREDETERMINED LOCATIONS OF A TELEVISION PICTURE

Matter enclosed in heavy brackets [ ] appears in the original patent but forms no part of this reissue specification; matter printed in italics indicates the additions made by reissue.

CROSS REFERENCE TO RELATED APPLICATION

The present application is a continuation-in-part of application Ser. No. 08/003,481, filed on Jan. 12, 1993, now U.S. Pat. No. 5,450,134.

BACKGROUND OF THE INVENTION

The present invention relates to the management of television facilities, particularly for the purpose of tracking television programs stored, in recorded form, and being transmitted within, the facility, as well as programs being received and transmitted by the facility.

Television programs, prior to broadcast or transmission over a cable system, may be conducted over a wide variety of paths within a facility and between facilities. Up to the present, no system or procedures have been available to reliably monitor the flow of such programs in real time. As a consequence, those managing such facilities generally must rely on the assumption that all operating personnel have taken the necessary steps to route the programs in the desired manner. At present, one of the most feasible procedures for determining what has actually been broadcast or distributed by a cable system is to make an off-air recording of all programs which have been broadcast or distributed to consumers. In other words, this procedure only allows the required determination to be made offline and hence not in real time.

The television industry has implemented several different computer systems and associated software designed to achieve specific objectives, such as the preparation of a log of programs to be broadcast or distributed. Some accounting programs have been developed which make use of manually entered data derived from the log of the programs intended to be broadcast as well as discrepancy reports from operators on duty at the time of broadcast and the viewing of off-air recordings. In addition, some limited automation of on-air programs has been attempted. However, to date, the capability of such systems is limited because, generally, they are not capable of automatically identifying the programs which are being routed through, or are stored in, a facility. Thus, the timely distribution of television programs to consumers, either by broadcasting or by delivery to a cable network, is for the most part, if not entirely, dependent on, and in most instances can only be verified by, the responsible operating personnel.

SUMMARY OF THE INVENTION

It is a primary object of the present invention to automatically monitor the routing of television programs, or their elements, within a facility and between facilities in order to permit the automatic generation of a record of the path followed by each television program or element and the time at which each program or element reached each distribution point along its routing path.

A more specific object of the invention is to provide the video signals of each program with information which identifies the program and which can be decoded in a manner to be supplied to a computer system, thereby allowing real time management of a television facility.

Another specific object of the invention is to provide such program identifying information in the region of a video signal which contains picture information, but which does not interfere with viewing of the associated program on a home receiver.

The above and other objects are achieved according to the invention by the provision of apparatus for tracking the flow of television programs within a program distribution system, each program including a video signal which contains information to generate a television picture, the distribution system including a plurality of units through which the television programs flow, the apparatus comprising: first signal processing means connected within the system for adding signal elements to the video signal of a program in order to add patterns of symbols, referred to hereafter as icons, to the television picture such that the symbols are disposed at predetermined locations of the television picture and a plurality of successive patterns constitute a code uniquely identifying the program; and second signal processing means connected within the system for detecting signal elements previously added to a video signal and for producing, in response to such detection, an identification of the program which included the video signal.

Objects according to the invention are further achieved by a method for tracking the flow of television programs within a program distribution system, each program including a video signal which contains information to generate a television picture, the distribution system including a plurality of units through which the television programs flow, the method comprising: adding, in first signal processing means connected within the system, signal elements to the video signal of a program in order to add patterns of symbols, referred to hereafter as icons, to the television picture such that the symbols are disposed at predetermined locations of the television picture and a plurality of successive patterns constitute a code uniquely identifying the program; and detecting, in second signal processing means connected within the system, signal elements previously added to a video signal and producing, in response to such detection, an identification of the program which included the video signal.

Because the elements of a television program are routed through a number of pieces of signal processing equipment before broadcast or delivery to a consumer cable system, these elements are subject to various artifacts and distortions not found in the original program material. Additional artifacts and distortions will, of course, be introduced into television signals during broadcast or distribution over a consumer cable system. All portions of a video signal not contained within the active picture window, also known as the scattered image area, which contains picture information are subject to and indeed are at some point reshaped, retimed, and/or replaced, which can make any information scheme using these areas often unreliable at best. The most reliable place to insert any form of identification scheme is therefore in the active picture area.

One major problem associated with using the active picture area is that the information may be inserted at a location which is objectionable to the viewer.

The present invention obviates, or at least substantially ameliorates, the first of these problems by utilizing icons which are relatively small compared to the picture as a whole, and by inserting these icons into video signals so that, in a picture produced by those signals, these icons will be located in an area of the picture which will no be seen on a properly adjusted home television receiver. This area will be referred to hereafter as the icon area. The outer boundary of the icon area coincides with the boundary of the above-mentioned scattered image area and the inner boundary of the icon area preferably coincides with the boundary of an area known in the art as the safe title area, and more preferably with the boundary of an area known in the art as the safe action area, which is slightly larger than the safe title area. The form and dimensions of these areas will be described below. In a properly adjusted home television receiver, the picture width and height adjustments are set to cause electron beam scanning to correspond to an area slightly larger than the picture tube usable area. Ideally, the adjustments are set so that the safe action area of the picture corresponds to the picture tube usable area.

A second problem is that distortions and artifacts exist when the program is viewed by the consumer. While these distortions may not be objectionable to the consumer, they may still cause unreliability in digital systems.

For example, because of the inherent characteristics of equipment which is currently employed for processing video signals, there are certain obstacles to accurate placement of information at defined locations of a picture area. As regards accurate positioning in the vertical direction, picture line counting is performed using the vertical sync as a reference, and digital video processors and video tape recording time base correctors replace both vertical and horizontal sync pulses. Therefore, the accuracy with which a particular picture line can be determined is a function of each individual piece of equipment employed during the processing. A common problem with some of the more popular video tape recorders is that they can lock to a video signal one line late. The time base corrector will then add sync information so as to shift the picture one line vertically. These shifts go unnoticed by the viewer because the missing line is outside of the picture area normally viewed on a home receiver.

With regard to picture element positions in the horizontal direction, the position of any picture element along a line of actual video is referenced to the leading edge of the horizontal sync pulse for that line. The types of video processing equipment referred to above and even the older analog processing amplifiers have the ability to change this relationship. Again, the viewer is not affected by such changes because they have no reference as to the actual location of the picture edge. In practice, this error is held to approximately one-half cycle of the subcarrier because larger amounts of picture phase error would cause horizontal blanking to expand beyond permissible limits.

Existing equipment also presents problems relating to analog brightness level and linearity of signal amplification. Even distribution amplifiers, which are the simplest element employed in television processing systems, can introduce significant analog errors into signals which they process. These errors include errors relating to differential gain, signal compression, high or low brightness levels, nonlinear transfer functions, etc. More complicated equipment can introduce even higher error levels. Therefore, when digitizing a signal which has passed through any of these devices, quantizing errors are likely to occur.

The elements, or icons, employed to provide information in accordance with the present invention have the capability of retaining their information content even when the video signals in which they are contained are subjected to the various shifts and distortions mentioned above. The icons are constituted by simple patterns which have sufficient redundancy to assure reliable detection even after having been subjected to vertical and horizontal displacements of the type described above. In order to assure reliable decoding even if the icons have been subjected to analog level quantizing errors, each picture frame includes, in a defined area, a specific reference icon having regions which represent picture black, white and gray levels. The difference between the known values of these levels and the pixel values encountered when reading the reference icon gives an indication of the magnitude of gain and linearity errors which occurred subsequent to encoding. This information can be used as offsets in reading the icons recovered from the other three icon areas of a picture frame.

More specifically, the invention enables the problems relating to picture element position shifts and analog signal distortion to be overcome by using icon patterns which can be reliably detected and identified with the aid of currently available technology, employing fuzzy logic, even in the presence of high levels of noise or distortion. As opposed to detection techniques employing the classic Boolean logic, where each signal element can have only one of two values, 0 or 1, fuzzy logic can associate each signal element with a value in a substantially continuous range between 0 and 1. Therefore, fuzzy logic pattern recovery does not rely on a perfect match. It returns a value as to the closeness of a match. Reasonable amounts of noise or distortion do not hamper symbol recovery when the icons are constituted by patterns within parameters contemplated by the present invention, giving the system a robustness not found in Boolean based information systems.

DESCRIPTION OF THE PREFERRED EMBODIMENTS

Figure 1:
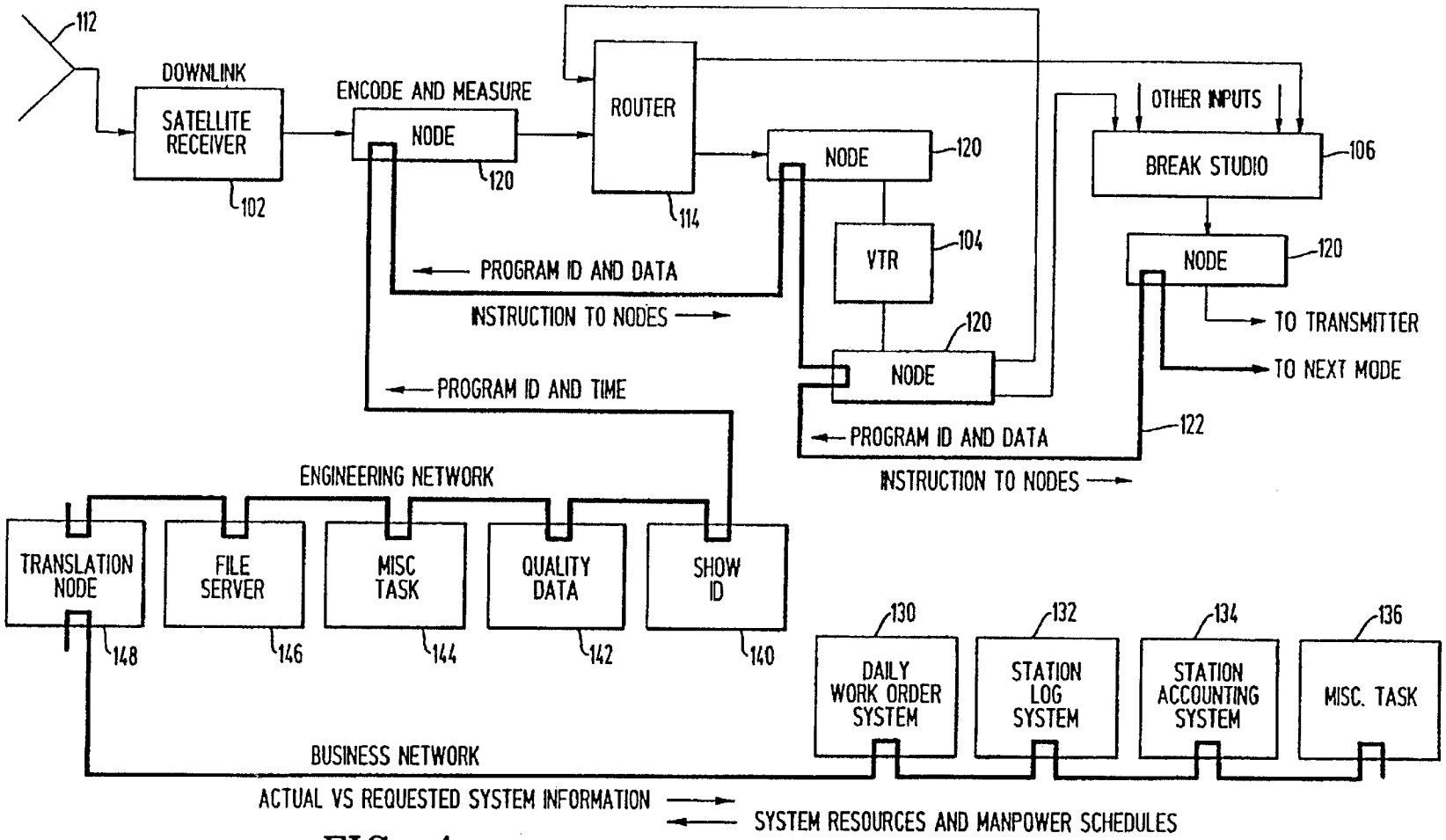
FIG. 1 is a block diagram showing a conventional television facility equipped with components for implementing the present invention.

FIG. 1 is a block diagram of a typical television distribution system which can be constructed in accordance with the present invention. The configuration of the exemplary system has been selected arbitrarily, simply for purposes of illustration. It is to be understood that any television program distribution system, regardless of its complexity and/or geographic extent, could serve as a basis for implementation of the invention. Furthermore, although the illustrated embodiment is described in connection with the N.T.S.C. standard, it should be appreciated that the present invention is applicable to all video formats, both those in present use as well as those formats which will be developed in the future.

The system illustrated in FIG. 1 includes television signal processing components, such as a satellite receiver 102, a video tape recorder 104 and a television signal processing and control area, known in the industry as a break studio, 106. Satellite receiver 102 is connected to a receiving antenna 112 for receiving programs which are downloaded from a satellite and programs arriving at receiver 102 are conducted via a router 114 to other components of the system, such as the components 104 and 106. Thus, a program arriving via a downlink at receiver 102 can be recorded by recorder 104 or immediately sent out over the air via control unit 106. Alternatively, a tape carrying a program which has previously been recorded can be conducted from VTR 104 to control unit 106 via router 114.

The system as thus far described represents an operational, albeit simple, television station. In accordance with the present invention, specially designed nodes 120 are connected to each junction where television program signals enter, leave, or can be routed within, the station. As will be explained in greater detail below, each of these nodes 120 can be controlled to identify each television program, or transmission, which passes therethrough, and/or to insert identifying indicia into each such transmission.

The system shown in FIG. 1 is completed by units which are provided to utilize information provided in a video signal in accordance with the present invention, and which are coupled to nodes 120 by a cable 122. These additional units include a supervisory computer system composed of, for example, a unit 130 which maintains a schedule of the daily work to be performed at the station, a unit 132 which provides a log of programming which will be broadcast by the station, a unit 134 performing accounting functions, and one or more units 136 performing miscellaneous tasks requiring information provided in accordance with the present invention. The supervisory computer system may also store information identifying the desired broadcast time of a program and use that information in conjunction with information indicating the location, i.e. the tape recorder, where the program is stored to issue control signals which begin playback and route the recorded output to the station transmitter.

The station further includes an engineering network composed of a unit 140 which stores the identification of each program handled by the station, a unit 142 which stores data relating to the technical quality of the picture and sound content of programming received and sent, a unit 144 which may perform miscellaneous tasks, a unit 146 which constitutes a file server that maintains an updated record of relevant data relating to the programming received and broadcast by the station and a unit 148 which permits exchange of information between units 130–136, on the one hand, and units 140–146, on the other hand.

The term "program" appearing in various legends in FIG. 1, and elsewhere herein, is employed to mean an identifiable television program element, i.e. a completed TV show or production, commercials, public service announcements, and any other segment, which will be or have been assembled for broadcast over the air or via a cable system. Of course, such a program may also be a live broadcast, such as of a news story or a sporting event. The structure and arrangement of conventional broadcast facilities are described in the current edition of the NAB (National Association of Broadcasters) Engineering Handbook.

Figure 2:
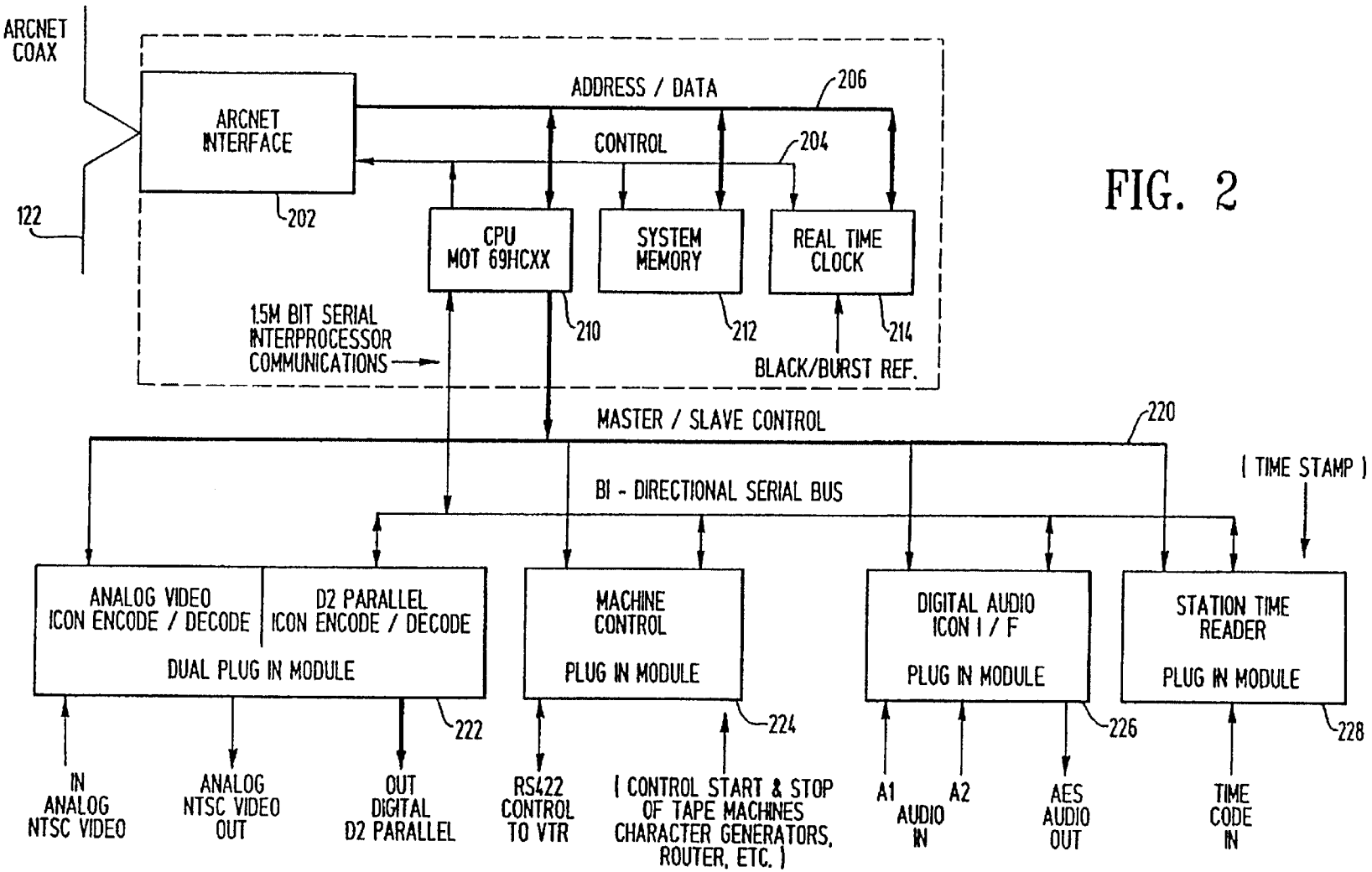
FIG. 2 is a block diagram showing one of the components according to the invention provided in the system of FIG. 1.

FIG. 2 is a block diagram showing one embodiment of a node 120 according to the present invention. The node includes an interface 202 which connects the node to cable 122. Interface 202 may be a local area network controller such as an interface marketed by Standard Microsystems Corp. under the model designation COM20020. Interface 202 is connected via a control bus 204 and an address/data bus 206 to a CPU 210, a system memory 212 and a real time clock 214. CPU 210 is connected via a master/slave control bus 220 to one or more modules 222, 224, 226 and 228.

Module 222 is constructed and controlled for inserting identifying indicia such as "icons" into a video signal or to read icons which have previously been inserted into the video signal. Module 222 includes an analog portion and a digital portion which can derive digital signals representative of icons in a video signal processed in the analog portion. The time at which a set of icons passes a particular node can be read from clock 214 and stored with data identifying the program and the node which it passed.

Module 224 is a machine control module which can be configured to control the operation of a component of the television distribution system in response to information derived from the video signal by module 222. Examples of components which are adapted for machine control include character generators, routers and video tape recorders such as the Ampex VPR-2B and the Ampex VPR-250 and other addressable components, such as video file servers.

Module 226 is a digital audio icon interface which can modify the audio portion of a television program in response to information which has been added to the video signal thereof and decoded in module 222. Module 228 is a station time reader which receives an input representing the current time and associates a time indication, or stamp, with each set of data obtained from module 222.

Machine control 224 and interface 226 are optional components which can be provided when desired. Certain of the capabilities which will be created by provision of such components will be described below, after the device and procedure for inserting information into a video signal and reading such information have been described.

Figure 3A:
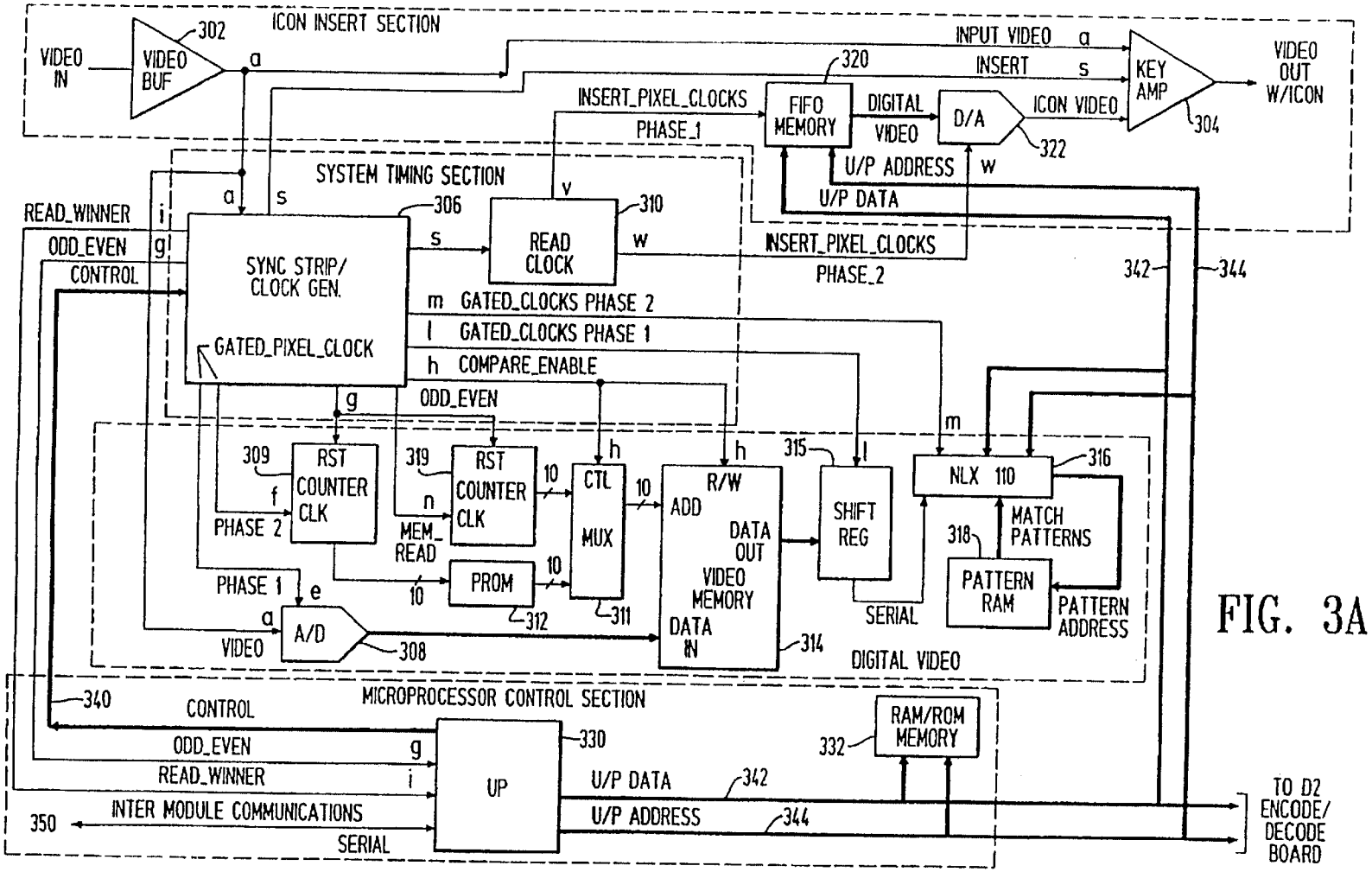
FIG. 3A is a block diagram of one unit of the component of FIG. 2.
Figure 3B:
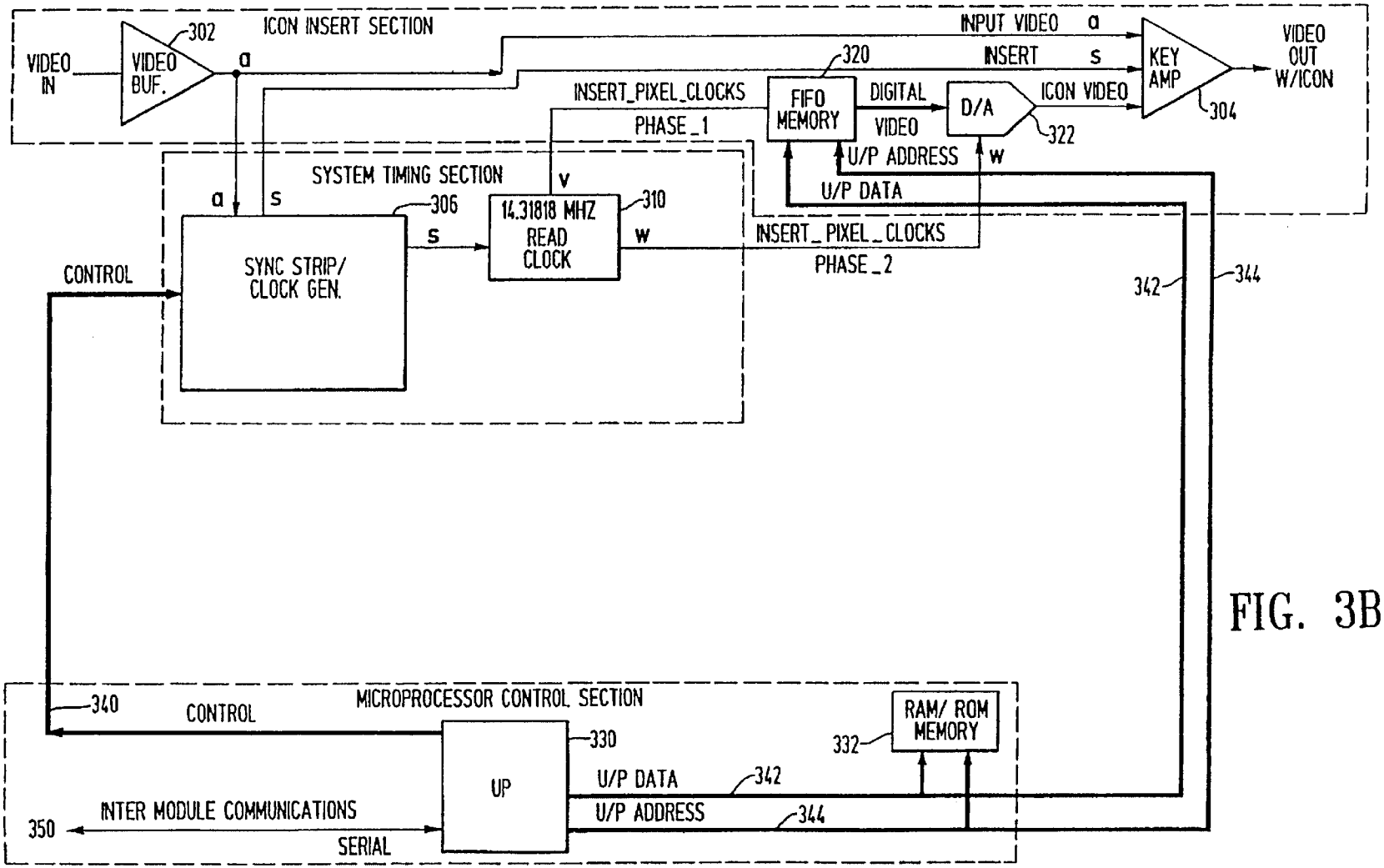
FIG. 3B is a block diagram showing those portions of the unit of FIG. 3 for inserting icons into a video signal.
Figure 3C:
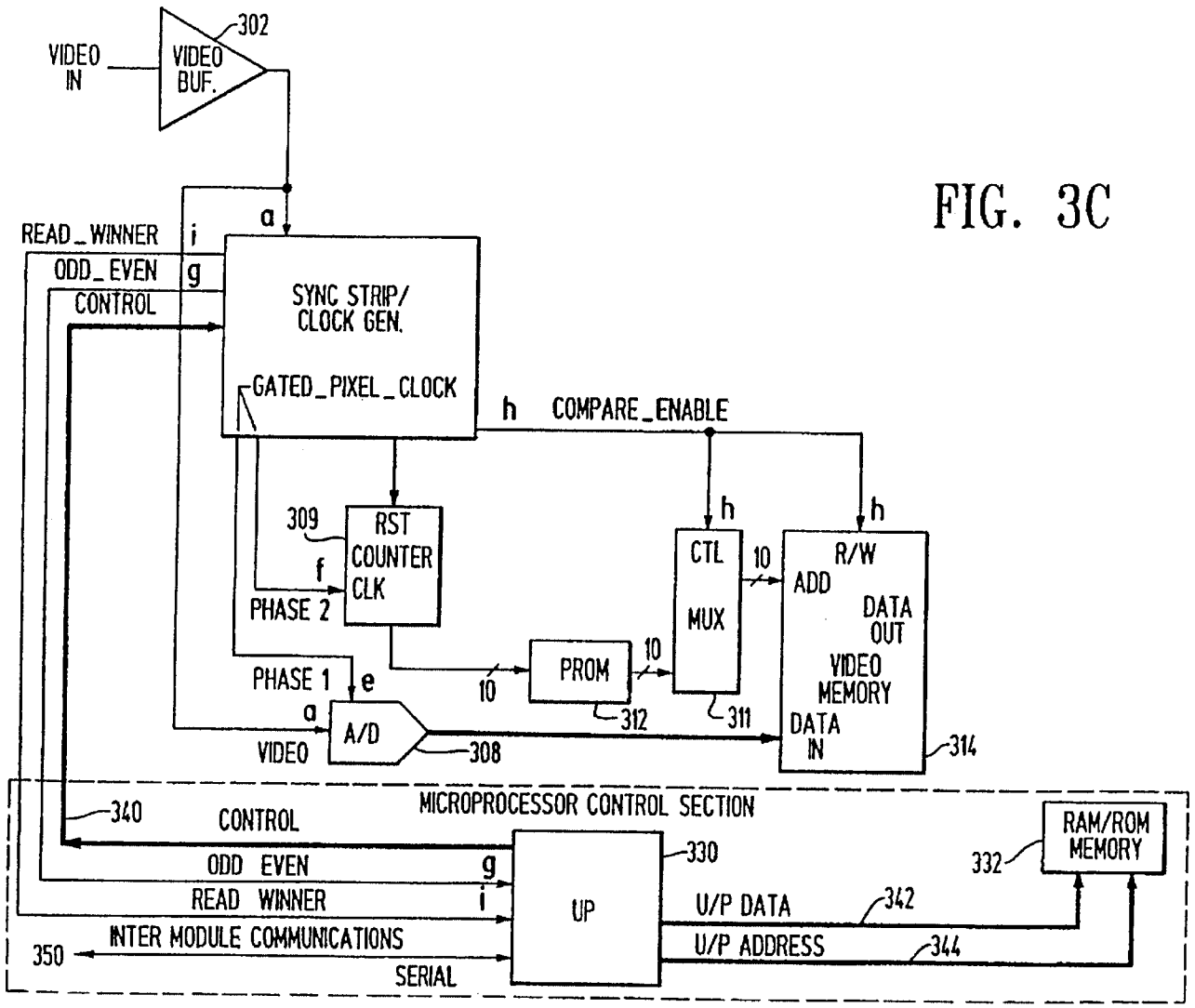
FIG. 3C is a block diagram showing those portions of the unit of FIG. 3 for reading icons from a video signal.
Figure 3D:
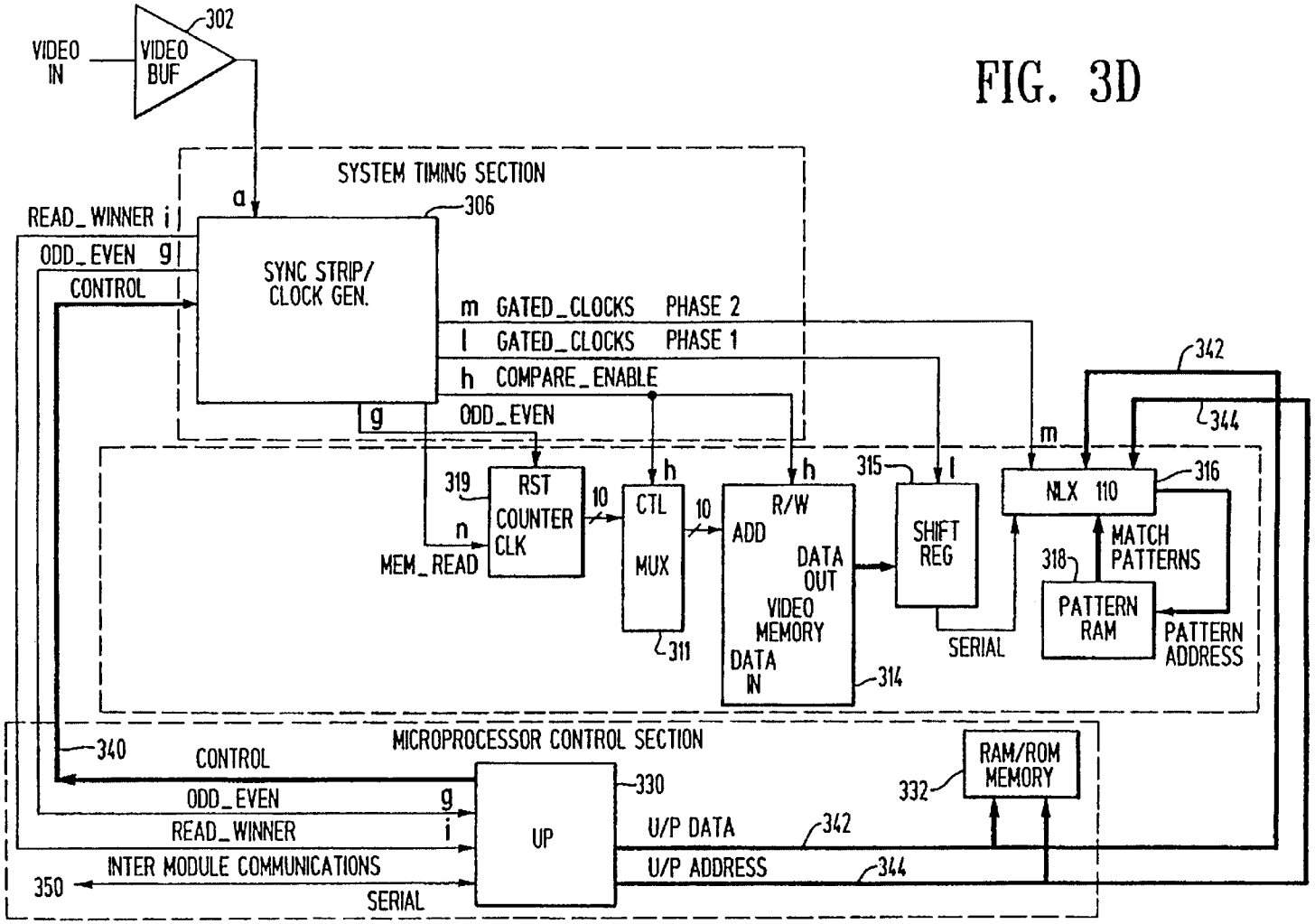
FIG. 3D is a block diagram showing those portions of the unit of FIG. 3 for identifying icons read from a video signal.
Figure 6A:
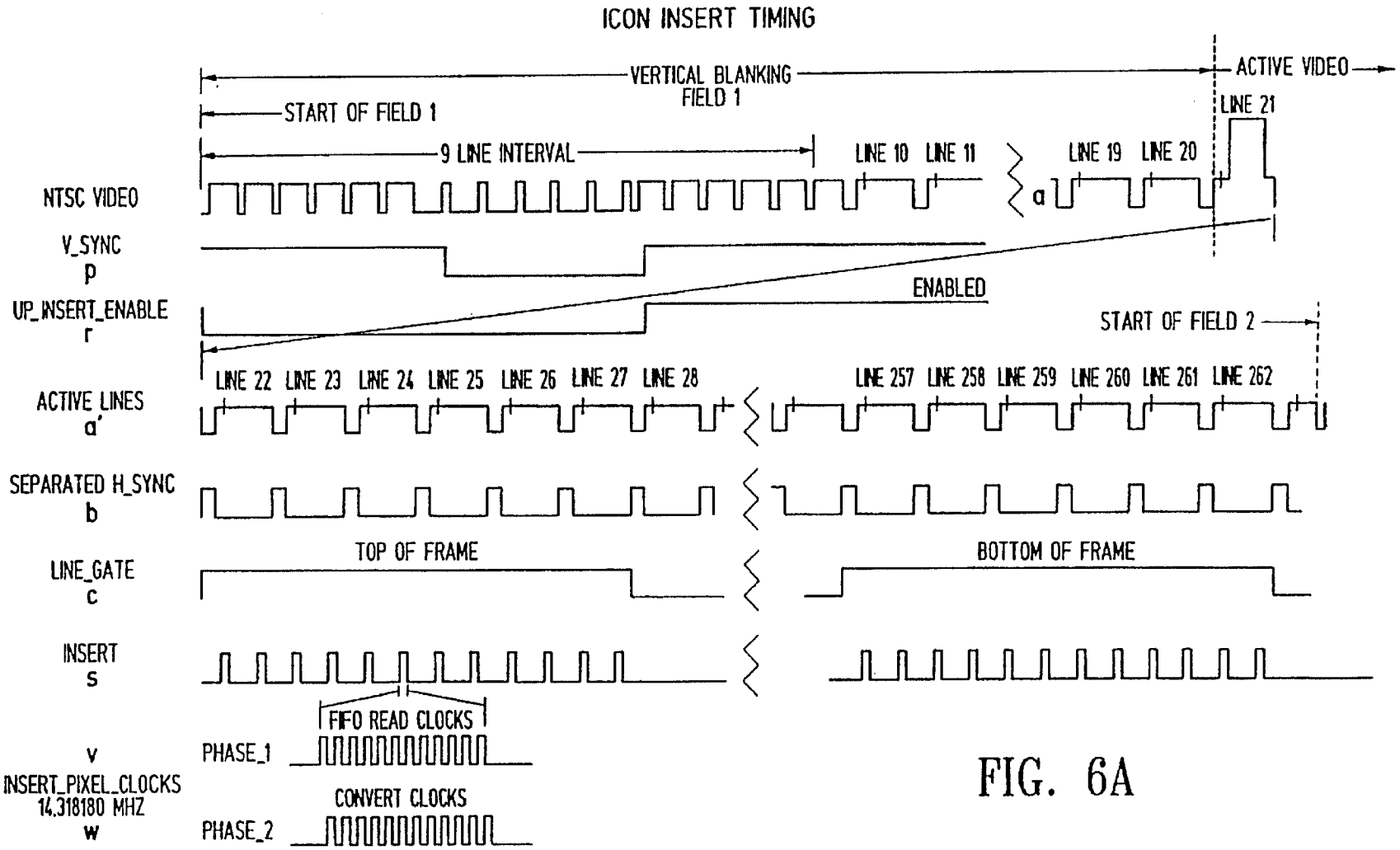
FIGS. 6A–6C are timing diagrams illustrating the operation of the device of FIG. 3.
Figure 6B:
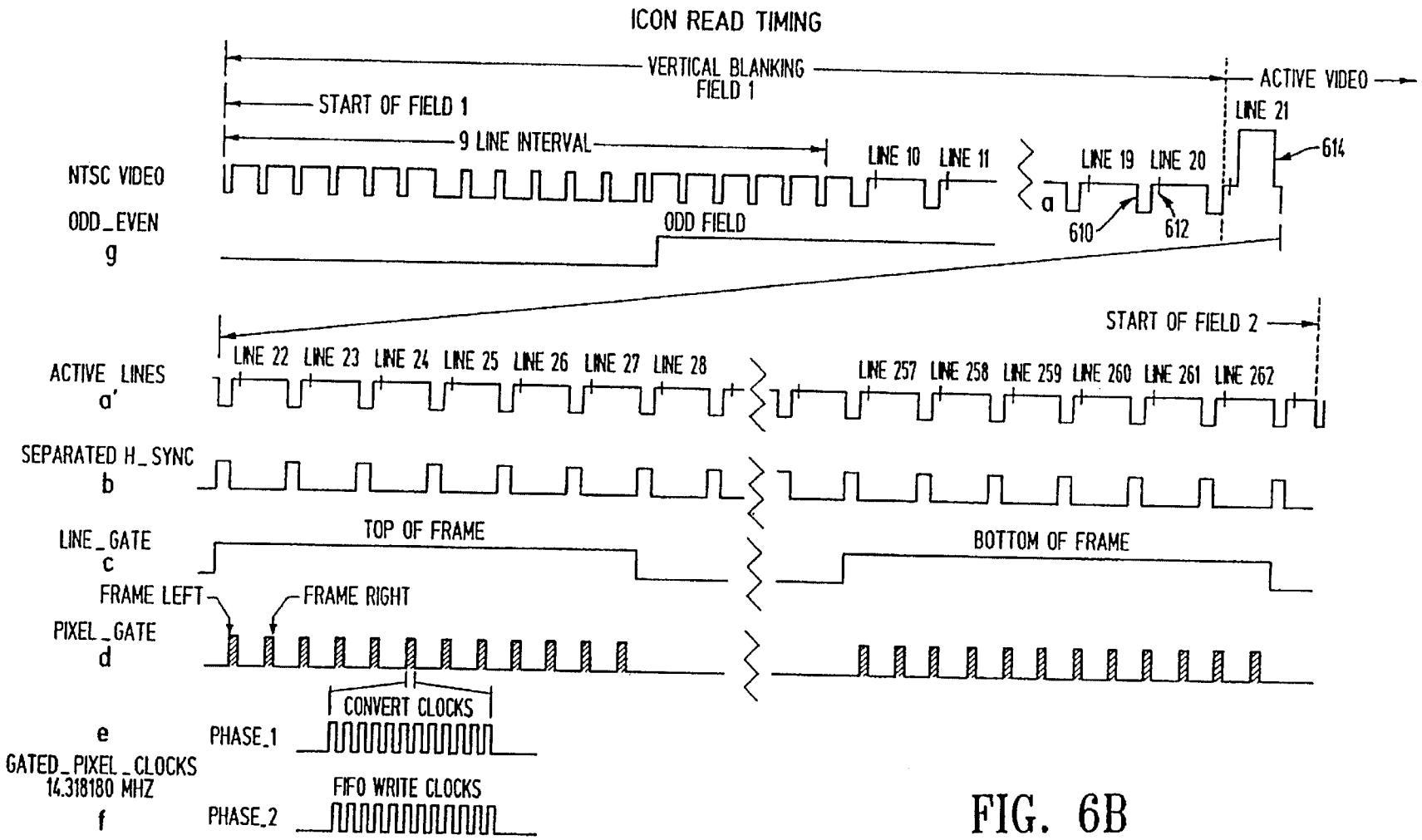
Figure 6C:
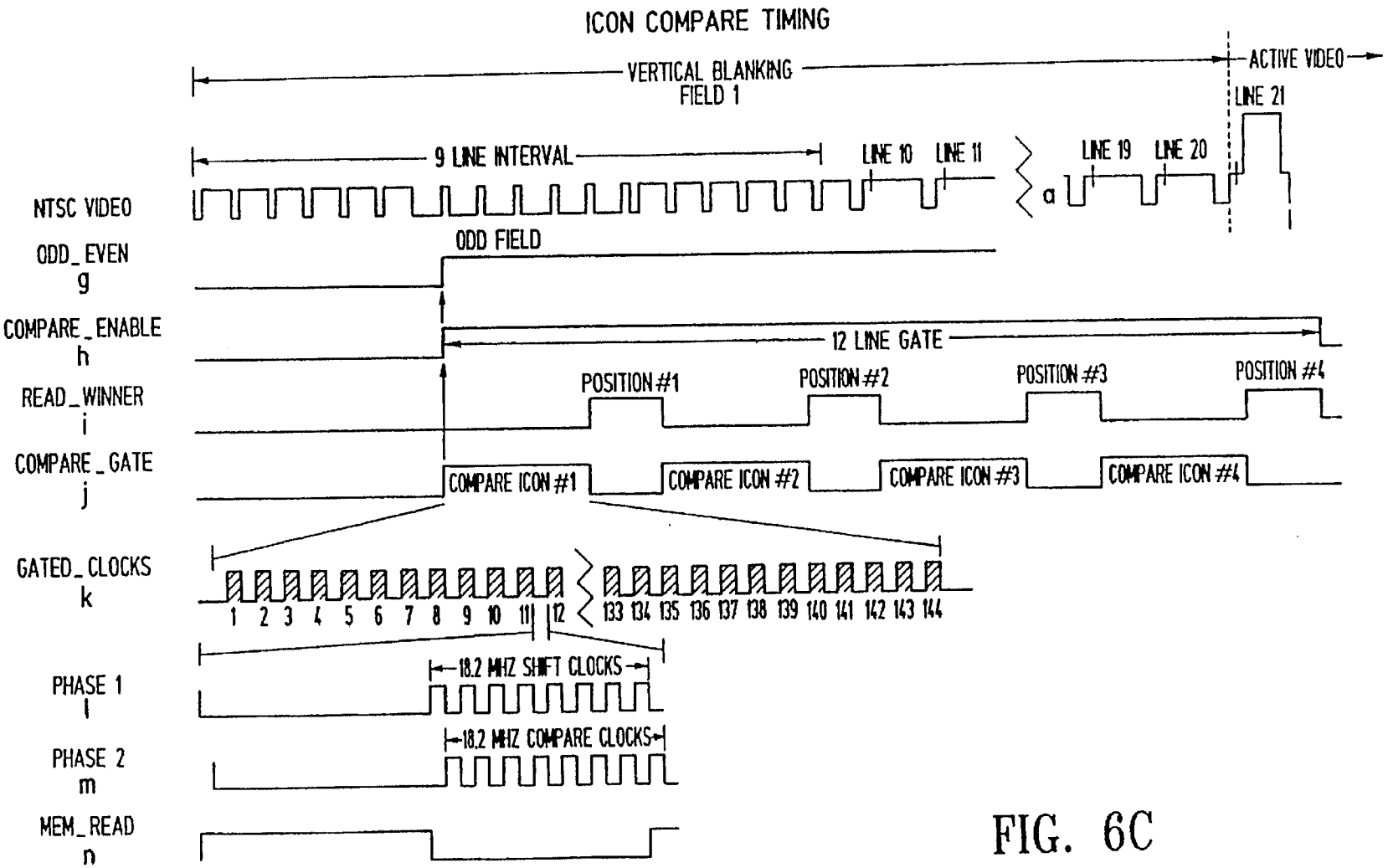

FIG. 3A is a schematic block diagram of the icon encode/decode module 222. FIGS. 3B–3D depict various portions of the module 222 in accordance with the function performed. FIGS. 6A–6C are timing diagrams showing the waveforms of signals at certain points in the circuits of FIGS. 3B–3D, respectively. The locations in the circuits of FIGS. 3B–3D where the signals of FIGS. 6A–6C appear are indicated by letters corresponding to those identifying the corresponding waveforms of FIGS. 6A–6C.

Turning first to FIG. 3B, there is illustrated one preferred embodiment of the portion of module 222 which interacts with a video signal in order to insert information into the signal. The circuit shown in FIG. 3B includes a video buffer 302 and a key amplifier 304 which are connected together in series in the associated television signal path. The video signal applied to the input of amplifier 302, waveforms a and a' in FIG. 6A, is conducted without modification to a first signal input of amplifier 304. Key Amplifier 304 is a conventional element used in television signal processing systems. It is basically a high speed video switch that passes, in this case, either the unmodified input video or video in which identifying information has been inserted after a D/A conversion process. In the illustrated embodiment, this identifying information is preferably in the form of graphic symbols or "icons" as explained below. Selection of the input signal to amplifier 304 is controlled by the signal "Insert", waveform s of FIG. 6A, which is generated by a sync stripper/clock generator circuit 306.

The video signal leaving buffer amplifier 302 is conducted to the sync stripper/clock generator 306 which has a basic timing element. The circuit 306 includes a type LM1881 video sync separator chip marketed by National Semiconductor, the output of which (designated INSERT) is connected to a subsidiary clock generator 310 as well as the key amplifier 304. The amplifier 304 has a second video input which receives one or more icons which can be added to the video signal. The icon data is provided to the second video input of amplifier 304 by circuitry which includes a FIFO memory 320 and a digital/analog converter 322. Signals representing the desired icon patterns are read from memory 320, are converted to analog form in converter 322 and are added to the video signal at the appropriate points in time.

Devices 306 and 320 are controlled by a microprocessor 330 which has an associated memory 332. Microprocessor 330 is connected to clock generator 306 via a control bus 340. Microprocessor 330 is connected to memory 332 and memory 320 via a data bus 342 and an address bus 344.

A signal up_insert_enable (waveform r in FIG. 6A) is generated in device 306 and supplied to microprocessor 330 via control bus 340. This signal alerts the microprocessor to load FIFO memory 320 with appropriate icon patterns stored in the microprocessor's associated memory 332. Microprocessor 330 does not have to load memory 320 with all icons to be stored into a frame at one time since the FIFO memory 320 can be read from and written to at the same time. In the illustrated embodiment, the data for only the first line of icons to be inserted into the frame is loaded into the FIFO memory at a time.

At the desired location in the field or fields of the frame of the video signal, the clock generator 306 under the control of the microprocessor 330, activates the timing signal INSERT which causes the clock generator 310 to issue a series of rapid clock pulses to the FIFO memory 320 and the D/A converter 322. The FIFO memory 320, in response to these clock pulses, outputs the previously stored icon information, a pixel at a time, which is converted to analog form by the converter 322 and is then inserted into the video signal by the key amplifier 304.

In this manner, information identifying a program may be added to the video signal of the program. The information is in the form of signal components which will appear at selected locations in the resulting television picture as icons, or graphic symbols. These icons can appear in a variety of patterns; each pattern represents a specific information unit, or datum; and a succession of these patterns provides the desired information.

Figure 5A:
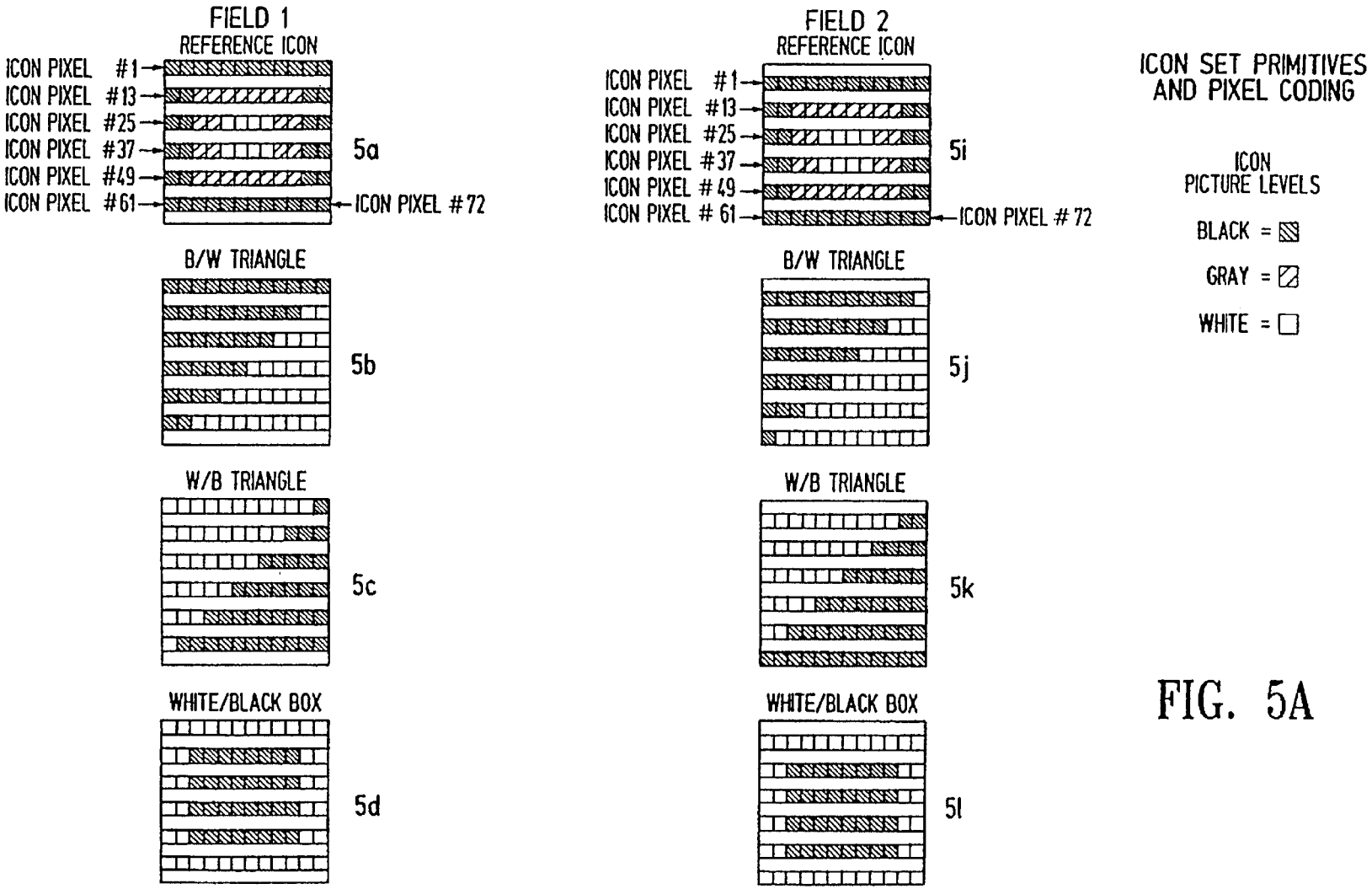
FIGS. 5A–5B are pictorial views of portions of a variety of identifying patterns which can be employed in the practice of the present invention.

In the illustrated embodiment, for each icon, a first set of pixels is inserted in successive lines of Field 1 of the frame as shown for example in FIG. 5A. To complete the icon, a second set of pixels is inserted in associated successive lines of Field 2 of the same frame.

Figure 4:
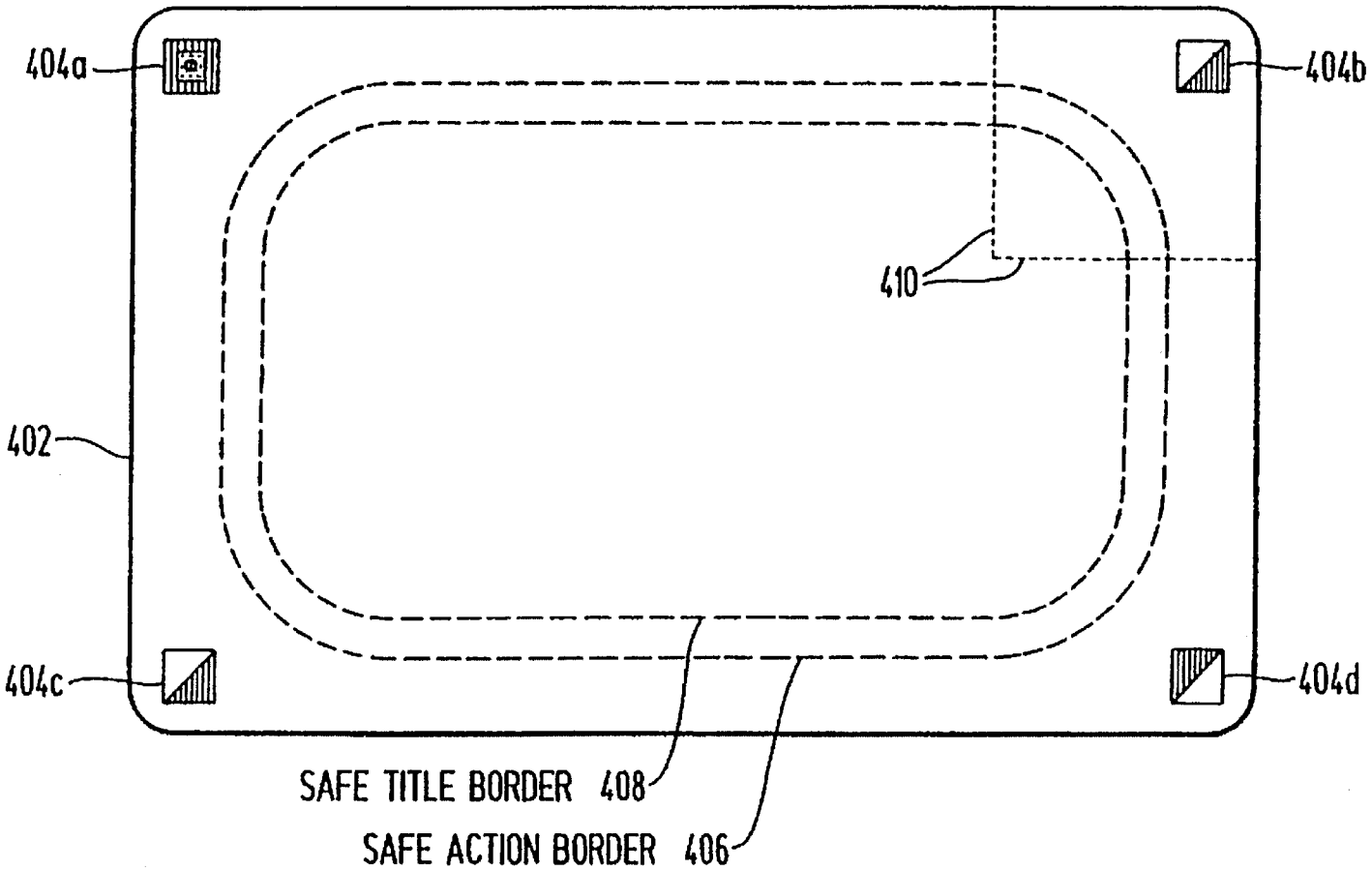
FIG. 4 is a pictorial view of a television picture screen, showing the location of identifying elements in accordance with the present invention.

To read the icons, the video signals in the preselected areas reserved for icons are converted into digital pixel signals and are then stored in memory 314 of FIG. 3C at locations such that all pixels of Fields 1 and 2 for a given icon can be read out together in a selected order. FIG. 4 shows an example of four such icon areas 404a–404d of a video frame. It is recognized that the icons may be placed in other areas of the frame.

The vertical positions and extents of icon areas 404 are determined by counting the horizontal sync pulses from the start of each field and producing vertical gate pulses in response to selected horizontal sync pulses. In the illustrated embodiment, two icons are inserted into lines 22–27 and two are inserted into lines 257–262 of each frame for a total of four icons per frame, as shown in FIG. 4. Since each frame has two interleaved fields, each icon has a vertical height of 12 lines as shown in FIG. 5A. It should be appreciated of course that various numbers of icons can be inserted into a particular frame. For example, three icons can be stacked in the same horizontal position in each corner of the frame for a total of 12 icons per frame.

The horizontal positions and extents of icon areas 404 are determined by producing a train of pixel clock pulses which divide each scan line into a plurality of pixel locations, counting these pixel clock pulses and producing horizontal gate pulses in response to selected pixel clock pulses. The coincidence of vertical and horizontal gate pulses correspond to an icon area.

FIG. 6B contains timing diagrams showing the waveforms of signals at certain points in the circuit of FIG. 3C. In FIG. 6B, waveforms a and a' show two successive parts of one field of a color television signal which starts with a vertical blanking interval, to the left of waveform a of FIG. 6B during which equalizing pulses and sync pulses are provided, followed by eleven picture lines (picture lines 10–20) which will not appear on the television screen. The vertical blanking interval is followed by an active video period composed of 242½ picture lines. As is known, each picture line includes a horizontal sync pulse 610, a color burst 612 and a picture information region 614. The region 614 containing picture information is depicted as a pulse in picture line 21 but is not depleted for the other picture lines.

FIG. 6B shows, at waveform g, the field identification pulse, odd_even, extracted from each field signal by device 306 of FIG. 3C. The odd_even signal is conducted to the reset input RST of a counter 309, the output of which is a ten bit parallel digital signal that represents the pixel address within the frame. Thus, the counter 309 resets and generates sequential ten bit pixel addresses when the field changes from odd to even and vice versa. It will be appreciated that the pixel frame addresses of each icon pixel will not be contiguous from line to line. Consequently, the ten bit pixel address generated by the counter 309 is conducted to a PROM device 312 which re-maps the pixel frame address to contiguous memory addresses of the memory 314. As a result, the pixels of each read icon entering memory 314 is stored into contiguous memory locations.

In FIG. 6B waveform b represents horizontal sync pulses, separated h_sync, extracted from the video signal of waveforms a and a'. This signal is generated within device 306 of FIG. 3C. By counting the separated horizontal sync pulses of waveform b of FIG. 6B, a signal line_gate as shown in waveform c of FIG. 6B, is produced which provides a first gate pulse synchronized with picture lines 22–27 at the top of the picture frame and a second gate pulse synchronized with picture lines 257–262 at the bottom of the picture frame. This signal is also produced in device 206 of FIG. 3C.

During each gate pulse line_gate, the generator 306 produces a series of pulses identified as pixel_gate pulses, which are shown in waveform d of FIG. 6B. Each pixel_gate pulse coincides with one horizontal row of a respective icon area. As previously mentioned, the frames of the illustrated embodiment have four icon areas, one icon area at each corner of the frame. Because each picture line passing through an icon area passes through two icon areas in the illustrated embodiment, alternate ones of these pixel_gate pulses coincide with a defined part of the beginning and end, respectively, of each picture line.

Each of these gate pulses is used to gate two series of gated_pixel_clocks generated by the generator 306, which are shown in waveforms e and f of FIGS. 6B. The gated_pixel_clocks e (phase 1) clock an A/D converter 308 so that only that portion of the video signal corresponding to a preselected icon area is converted into digital pixel data. The gated_pixel_clocks f (phase 2) clock the counter 309 which generates the pixel frame addresses described above which are mapped by the PROM 312 to contiguous memory addresses. Each pixel written into memory 314 is constituted by an eight-bit word written into memory 314 in parallel.

Referring now to FIGS. 3D and 6C, icons are identified by comparing icon pixel data stored in addressable digital memory 314 during a previous icon read operation with icon pixel data stored in a pattern RAM 318. For this purpose, at the end of each picture frame, the pixel data read from the picture frame and stored in memory 314 are outputted to a shift register 315 which delivers the pixel data a bit at a time to a pattern recognition unit. In the illustrated embodiment, the pattern recognition unit is implemented with a fuzzy pattern comparator 316 and pattern RAM 318. One suitable embodiment of comparator 316 is a device marketed by American NeuraLogix, Inc., of Sanford, Fla., under model designation NLX 110. This device has eight pattern data inputs, so that RAM 318 may be provided with eight data outputs for simultaneously supplying up to eight selected patterns to comparator 316.

The NLX110 integrated circuit allows for simultaneous comparison of up to eight known patterns with one unknown pattern. To make maximum use of this architecture, the illustrated embodiment of the present invention utilizes eight different icon patterns. One icon pattern is designated as a reference icon pattern and is located in the upper left hand corner of the active picture window, as indicated at 404a in FIG. 4. This reference icon pattern is used by control microprocessor 330 to set the error threshold of the NLX110 pattern comparator 316 for the next three icons, present in areas 404b, c and d, thereby tracking out noise or distortion on the incoming icons.

The other seven selected icon patterns constitute an icon primitive set. Using the formula for the number of permutations of N (=7) patterns take R (=3) at a time yields 210 different pattern permutations possible per picture frame. The first 128 permutations can be assigned to correspond to the seven bit ASCII code for plain text transmission. The remaining values can be assigned to special purposes. With this scheme, when program identifying information is being provided, three different icon patterns plus the reference icon pattern will be present in a frame. Thus, each picture frame can provide one alphanumeric identification character. Given the conventional television frame rate of 30/second, icons providing complete identifying information need be present in a television program signal for only a few seconds.

By extension, increasing the number of different icon patterns would increase the quantity of information contained in each frame. However, it is anticipated that the complexity of the circuitry and control programming would likely increase as the number of different icon patterns increases. In addition, an increase in the number of different icon patterns would make visual interpretation by station personnel more difficult.

The types of icon patterns employed in the illustrated embodiment of the present invention have characteristics which enable them to be identified, or decoded, by a fuzzy logic comparator with a high degree of reliability even when the video signal contains noise or distortion or when an error in the timing of the video signal prevents one or two rows or columns of icon pixels from reaching comparator 316. In the illustrated embodiment, these icon pattern characteristics include the following: there are only eight different icon patterns to be recognized, while each pattern is composed of 144 pixels; each pattern consists of pixels having only two or three different values spaced relatively far apart on the gray scale; each pattern has no more than four changes in gray level value in both the horizontal and vertical directions; and, with the exception of two corners of each triangle pattern, a given gray level value is present at at least two successive pixel locations in both the horizontal and vertical directions. Therefore, the eight different patterns can be made to represent relatively simple geometric shapes which differ sufficiently from one another to permit reliable identification of each pattern with comparator 316 set to a relatively low recognition threshold.

In the illustrated embodiment, the icon information stored for a particular frame is identified, or decoded, within a period equal to 12 picture lines with 18.2 MHz shift clocks. As shown in FIG. 6C, waveform g is the signal odd_even produced in device 306 to identify the current field of each frame. The state of this signal is inverted by the leading edge of each v_sync pulse (FIG. 6A). At each positive transition of the signal odd_even, corresponding to the vertical blanking interval at the start of each odd field, device 306 generates a pulse compare enable having a period of 12 picture lines, as represented by waveform h.

During each pulse compare_enable, device 306 generates a train of four spaced pulses read winner, represented by waveform i, and four spaced pulses compare_gate, represented by waveform j. Each pulse compare_gate immediately precedes an associated pulse read_winner. During the period of each pulse compare_gate, device 306 generates a train of 144 pulses of gated_clocks, shown in generalized form as waveform k.

As shown by waveforms l and m, each pulse of gated_clocks is composed of two trains of eight clock pulses, each at a pulse rate of 18.2 MHz. In addition, device 306 generates a pulse mem_read, shown by waveform m, for each pulse of gated_clocks. Counter 319, FIG. 3D, is reset by the odd_even pulse, waveform g, at the start of every frame. Mem_read is supplied to the input of counter 319 which provides a ten bit pixel read address for memory 314 via mux 311, FIG. 3D.

One of the trains of eight clock pulses, identified as waveform 1 (phase 1), is supplied to shift register 315 to shift pixel bits serially into comparator 316 and the other train, identified as waveform m (phase 2), is supplied to comparator 316 to trigger a comparison operation. Each pulse of phase 1 shifts a single pixel bit and each pulse of phase 2 triggers a comparison with respect to the previously shifted bit. The bits of phase 2 are shifted in phase by 180° from the bits of phase 1.

Each bit arriving from shift register 315 is compared with an associated bit of each of the eight patterns supplied by RAM 318. After all bits of one icon have been compared, a corresponding read_winner pulse is delivered to microprocessor 330, and in response to that pulse, microprocessor 330 reads the comparison result out of comparator 316. This comparison result is in the form of a signal identifying the reference pattern which most closely matches the pattern represented by the bits delivered from register 315. This signal is supplied to memory 332 along with identification of the associated icon location in the active picture window.

The trailing edge of compare_enable generates, in microprocessor 330, a done signal indicating that all four icons of a frame have been individually identified as to pattern and location. The information, i.e. the character, which they represent can be identified, for example, by means of a look-up table in memory 332.

A node in accordance with one aspect of the invention is disposed at the input side of the transmitter to read the identifying information stored in the television signal so as to provide the central data processing system of the facility with a contemporaneous and reliable indication that broadcast of the identified program has begun. This information will be stored together with an indication of the time that transmission began.

In addition, after reading, the stored information may be deleted from the television signal prior to transmission. Alternatively, however, the identifying information, i.e. the icons, may remain in the television signal at the time it is broadcast or transmitted for use in order to determine viewing patterns at individual television receivers, for example in order to derive program viewership. For this purpose, each television receiver which is to be monitored would be equipped with a decoder containing appropriate portions of the node of FIG. 2 connected to the output of the receiver tuner or forming part of an external tuner. Identification data contained in each program to which the receiver is tuned could then be stored together with a time indication or could be transmitted, possibly immediately, via a television line to a control data collection point. As a consequence, program viewing ratings can be determined on a virtually instantaneous basis.

When the identification data according to the invention is used to determine viewing patterns, it may be desirable to transmit such data at fixed intervals of, for example, five minutes during each program, as well as at the start of each commercial, and after each commercial, in order to monitor patterns of channel switching in the middle of programs. Such a technique for monitoring viewing patterns would eliminate ratings errors that result from incorrect reporting by viewers of the programs which they watched.

FIG. 4 shows an active picture window having an outer border, or boundary, 402 delimiting the area of a video image formed by all picture information contained in a video signal, i.e. all portions of the video signal other than the horizontal and vertical blanking portions. Within the active picture window there is a safe action area enclosed by an outer border, or boundary, 406, and within the safe action area there is a safe title area enclosed by an outer border, or boundary, 408.

According to Specifications published by the Society of Motion Picture and Television Engineers as RP27.3-1989, the safe action area will contain that part of the picture which it is desired to present to the viewer, i.e. all significant action in a television program, and the safe title area will contain all of the more important information, such as titles, to ensure that this information will be visible on the majority of home television receivers.

In further accordance with those specifications, the following dimensions are associated with the picture area, in terms of percentage of the vertical height of the active picture window enclosed by border 402:

Horizontal width of active picture window—133%;

Vertical height of safe action area—90%;

Horizontal width of safe action area—120%;

Vertical spacing of bottom edge of safe action area from bottom edge of active picture window—5%;

Horizontal spacing of right hand edge of safe action area from right hand edge of active picture window—6.67%;

Radius of each corner of safe action area—24%;

Vertical height of safe title area—80%;

Horizontal width of safe title area—106%;

Vertical spacing of bottom edge of safe title area from bottom edge of active picture window—10%;

Horizontal spacing of right hand edge of safe title area from right hand edge of active picture window—13.33%

Radius of each corner of safe title area—21%.

FIG. 4 further shows four small rectangular icon areas 404 located at the four corners of the active picture window, outside of the safe action area enclosed by border 406. Preferably, icon areas 404 are confined to corner regions each delimited by horizontal and vertical radial lines 410 originating at the center of curvature of the respective corners. These regions provide adequate space for the icons while assuring that they will not be seen by home viewers. However, if desired, icon areas 404 can be located wholly or partly within border 406, but preferably outside of border 408. In this case, icons in areas 404 will create no more than minimal viewer distractions, particularly since, as will be described below, icons will normally be present in a program element for only a period of several seconds. On the other hand, because icon areas 404 are located in the active picture window, they can be visually observed by personnel at a television station and, if played from tape in sufficiently slow motion, can be visually interpreted.

One icon area 404a, for example at the upper left corner of area 402, may be reserved for a reference icon which may have a special shape and which is present in each television picture frame that contains identifying information. The information contained in the frame can be represented by the presence or absence of icons at the other three locations and/or by the shape of the icon or icons at one or more of the other three locations.

A simple example of an icon scheme according to the invention is shown in FIG. 4, where all of the icons have a square or rectangular outline. Such outlines can be produced in a relatively easy manner by gating circuitry as described above. The reference icon area 404a is located at the upper left corner and has the form in the illustrated embodiment of a hollow black rectangle enclosing a hollow gray rectangle, with a white square at the center. The other three icons 404b–d are divided diagonally into a black triangle and a white triangle; to facilitate differentiation, the black triangles of icons in areas 404b and c point down and to the right; that of the icon in area 404d points up and to the left.

Figure 5B:
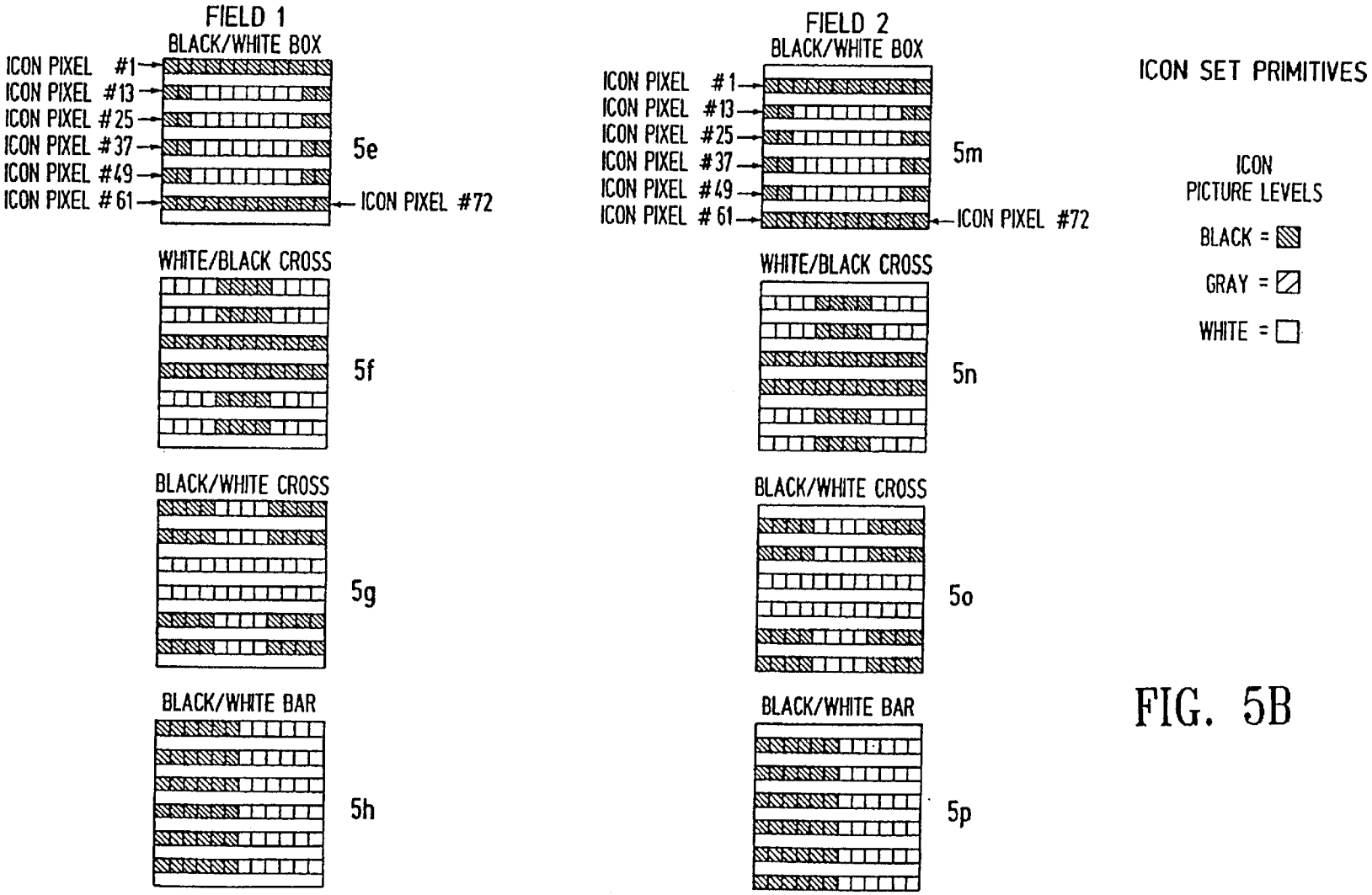

FIGS. 5A–5B show a number of possible icon patterns which may be used in the practice of the present invention. Icon field patterns 5a–5h of FIGS. 5A–5B show the icon pixels present in Field 1 of a television picture frame for eight unique icons, while icon field patterns 5i–5p show the corresponding icon pixels present in Field 2 of the same picture frame for the same eight icons. When displayed on a television screen, the lines of the associated icon field patterns are interlaced to depict a complete icon pattern. Thus, the field patterns 5a and 5i are combined to form the reference icon pattern in area 404a of FIG. 4, while the icon field patterns 5b and 5j form the icon pattern in area 404d of FIG. 4 and icon field patterns 5c and 5k form the icon pattern in areas 404b and c of FIG. 4. Icon field patterns 5d and 5l, 5e and 5m, 5f and 5n, 5g and 5o, and 5h and 5p may be respectively combined to form five other icon patterns which may be employed. In the illustrated embodiment, white pixels are depicted without hatching, gray pixels with wide hatching and black pixels with close hatching.

It is appreciated of course that other icon patterns may be employed. In the preferred embodiment, however, each icon comprises a plurality of pixels having different gray levels or other colors. Also, each icon pattern is relatively simple and has a relatively large number of pixels so as to provide a high degree of redundancy and imperviousness to signal degradation.

Program information provided according to the present invention can be put to a variety of beneficial uses. By way of example, the information provided by icons according to the invention can be employed to assist analysis of edited program material. Because of the layering nature of video tape program editing, the source of the original material, i.e. the tape on which the original video information is stored, is sometimes difficult to determine. Re-editing of such a program would be facilitated by using icons to label every frame on a given reel of tape with a unique symbol or set of symbols. When the finished program is then played through an icon decoder, an accurate shot list can be assembled.

Machine readable commercial position information is also readily provided. During live broadcasts, such as sporting events, commercials are not transmitted at specific times, but float within the body of the program. Icons can be inserted at the originating point of the program to arm, or trigger, automatic commercial insertion equipment at every station which carries the program. In this manner, all local affiliates of a network or cable originator would remain in sync with the live programming.

Icons can be employed to embed identification into programs and/or commercials. By embedding icons in finished programs or commercials, they can be monitored by off air receivers to make a log of actual vs. intended program material broadcast. In addition, bills to advertisers can be automatically generated.

Selected icon patterns could be reserved to serve as smart test signals, or test signal identification patterns which would allow measurement equipment in television facilities to automatically make appropriate measurements on test signals as they pass through the measurement device. The information derived in this manner can be relayed to a node and then to the station control computer for use to control various processes in the station and to generate task lists and a database.

During field production, icons can be employed as reel and take identifiers. The icon encoding circuitry described above can be adapted to operate in conjunction with portable video tape recorders either as stand alone equipment or as part of a video camera. By utilizing a portable data entry device such as a hand held computer, a director can enter reel, scene and take numbers into the video taping equipment just prior to shooting the scene. This information would go to an embedded icon encoder within the video recorder or camera so that all recorded frames would be labeled with the appropriate information. This information would be of great value in post production of the finished program and would constitute a machine readable equivalent of the clapboard and slate which are presently used.

Icons can be employed to provide cross country routing information. Special instructions can be encoded, in the icon format in accordance with the present invention, in the leader information of a program or commercial. This information would then be usable in real time by automatic switching equipment located in different parts of the country to route the signal to its destination without it being necessary for personnel at the various switching points to have prior knowledge of the specific route.

According to one feature of the invention, use is made of icons which are added to a video signal with precisely set gray scale values relative to the video signal level at the node where the icons are added. This allows use of gray scale information subsequently obtained from a reference icon, whose pattern is always the same, to facilitate reading of the other icons in a set and to permit adjustment of the video signal voltage level.

Thus, referring to FIG. 3A, before inserting icons, specific signal levels in the waveform a, for example the sync tip and burst levels, are measured and the icon gray scale levels are adjusted, prior to insertion at key amp 304, to bear a specific relation to the measured video signal levels.

Adjustment of the icon gray scale values can be effected, for example, by altering the digital icon pixel values in memory 332, or by varying the analog gain, or conversion coefficient, of converter 322.

When the video signal from amplifier 304 is received at a remote node, and a reference icon is digitized and detected, the digital values for the icon gray scale levels are used to enhance detection of other icons in a set. For example, under control of memory 332, the digital values of the pattern pixels stored in RAM 318 could be adjusted to correspond to the digital values of pixels associated with the same gray scale levels in the reference icon. Preferably, the reference icon has every gray scale level which will be in any one of the other icons and, more preferably, the reference icon has pixel regions with at least three different gray scale values, e.g. black, white and a gray value midway between black and white.

In further accordance with the invention, the detected reference icon gray scale levels can be used to indicate, and then correct, video signal amplitude shifts. If the video signal is unchanged from the point at which icons were inserted, a digitized reference icon will have the known, nominal digital gray scale values. Therefore, no video signal correction is needed. However, if the digitized gray scale values of the detected icon differ from those nominal values, some change has occurred in the video signal, possibly within amplifier 302.

Thus, the detected digitized gray scale values may all be equally higher or lower than the nominal values, indicating that the d.c. level of the video signal has shifted, and/or the mathematical difference between the detected digitized black and white values may be larger or smaller than the difference between the nominal black and white values, indicating that the amplitude of the video signal has changed and/or the relation among the three detected digitized values is different from the relation among the three corresponding nominal values, indicating that the video signal has experienced some distortion. The resulting information can be derived under control of microprocessor 330 and then used to correct for the detected changes in the video signal. For example, the output of amplifier 304 could be connected to a device which is digitally controllable to vary the d.c. level, the amplitude, and/or the amplitude linearity of the video signal under control of the information derived from the detected reference icon gray scale values. Such a device could be constructed on the basis of principles well known in the art. Alternatively, amplifier 304 could be connected to a control device which responds to digital signals to vary the d.c. offset, gain and gain characteristic, i.e. the shape of the output/input curve, of amplifier 304.

According to a further feature of the invention, the exact position of the reference icon in a picture frame is determined in order to provide information identifying the locations of the other icons in a set. This determination is based on the fact that if the locations of icons in a frame experience a shift, all icons in that frame will shift by the same amount. Therefore, if the shifted position of the reference icon is determined, then the shifted positions of the other icons will be known.

One way in which such a determination can be made is by establishing an enlarged pixel window for reading the reference icon pixel data into video memory 314. For example, such window could be defined by gates which cover picture lines 21–28 in field 1 and corresponding lines in field 2 and 16 pixel clock pulses per line. Then, a normal window corresponding to the normal pixel gates, 12 lines×12 clock pulses per line, is shifted across the enlarged pixel gate. In view of the relative sizes of the enlarged pixel window and the normal window, the normal window can have any one of twenty-five different positions in the enlarged window. For each window, the stored data is compared with the reference icon in comparator 316 and the comparison result, or score, is stored in memory 332. One such window will normally correspond to the expected location of the reference icon. The score which represents the best correlation, or comparison, corresponds to the window which is actually aligned with the reference icon.

In accordance with the invention, eight patterns can be supplied to comparator 316 to correspond to eight different window position, or eight different sets of quantization, or gray, levels, or any eight combinations of window positions and gray level sets, and these patterns can be compared with pixel data representing the original reference icon in a normal 12 line×12 pixel clock pulse area. The closest comparison then indicates the current reference icon position and gray level values and the current reference icon position can serve to adjust the gates for reading the other icons.

A number of different pattern recognition procedures can be used. To cite one example, for each position of the normal window in the enlarged window, the reference icon pixel data which has been read is compared with data representing eight different reference icon patterns, each of these patterns representing a different set of gray levels. For example, in one set the gray levels may correspond to those originally used for the reference icon, in several other sets the gray levels may be shifted up or down relative to those originally used for the reference icon, and/or in several other sets the gray levels may differ from one another by more or less than do the gray levels used for the reference icons. After such comparison has been performed for all twenty-five possible positions of the normal window in the enlarged window, the comparison which produces the highest score will identify both the position of the reference icon in the enlarged window and at least approximate differences in magnitude between the gray levels in the reference icon which has been read and the original reference icon gray levels. This procedure requires twenty-five comparison cycles.

According to an alternative procedure, it is initially assumed that the gray levels in the reference icon which has been read are the same as those originally used to create the reference icon and in each comparison all of the reference icon pixel data which has been read, corresponding to the enlarged window, is compared with data representing the original reference icon data in eight different normal window positions in the enlarged window. For all normal window positions, this requires a maximum of four comparison cycles. By ignoring one arbitrarily selected normal position, the number of comparison cycles can be reduced to three. Then, after the location of the reference icon in the enlarged window has been determined, the data which has been read at that location is compared with different gray level sets, as described above, to identify the gray level shift which has occurred. In this case, several comparison cycles can be performed with different sets of gray level combinations to achieve a more precise indication of gray level shifts between the original reference icon and the reference icon which has been read.

According to a variation of the alternative procedure, for determining the location of the reference icon in the enlarged window, each comparison cycle can be carried out to compare the data which have been read at eight different locations in the enlarged window with data representing the original icon. This requires configuring the connections to comparator 316 and RAM 318 (FIGS. 3A & 3D) and rerouting data from shift register 315 in an appropriate manner.

Preferably, the icon positions are determined before icon gray levels are monitored.

In further accordance with the invention, icons are provided in a video signal in a manner to permit the icons to be replaced with video image signal portions that correspond essentially to the original video signal. Such icon replacement may be desirable prior to sending a program over the air or into a cable distribution system.

This may be achieved by adding icons to every second frame or to only one field of each frame. Then, when icons are to be eliminated, video image signal icons can be replaced by portions which are disposed in the frames or fields that do not contain icons at the same locations as the icons. This only requires that those video signal elements be delayed by one frame or field period and then be inserted in place of the icons, in the same way that the icons were originally inserted.

According to another feature of the invention, the quantity of information in a video signal can be increased by providing a plurality of icon sets in a single field or frame. Each set preferably includes a reference icon and a total of up to four icons. The icons may be arranged in two vertical columns outside of the safe action border and along the vertical edges of the video image area. The icon sets could follow one another vertically or be nested in one another.

In such an arrangement, each icon set could carry a specific type of information associated with a respective programming function, e.g. scheduling, accounting, time of passage through a facility, program origin, etc.

An array of icon sets as described above could be added to a test signal to form a probe frame. A probe frame is a video frame which contains image data constituting predetermined test signals in a test signal area corresponding to the safe title area of the active picture window. These test signals are used in a known manner to perform verification and quality checks on a particular transmission path prior to sending the video signal for a program or program segment.

Figure 7:
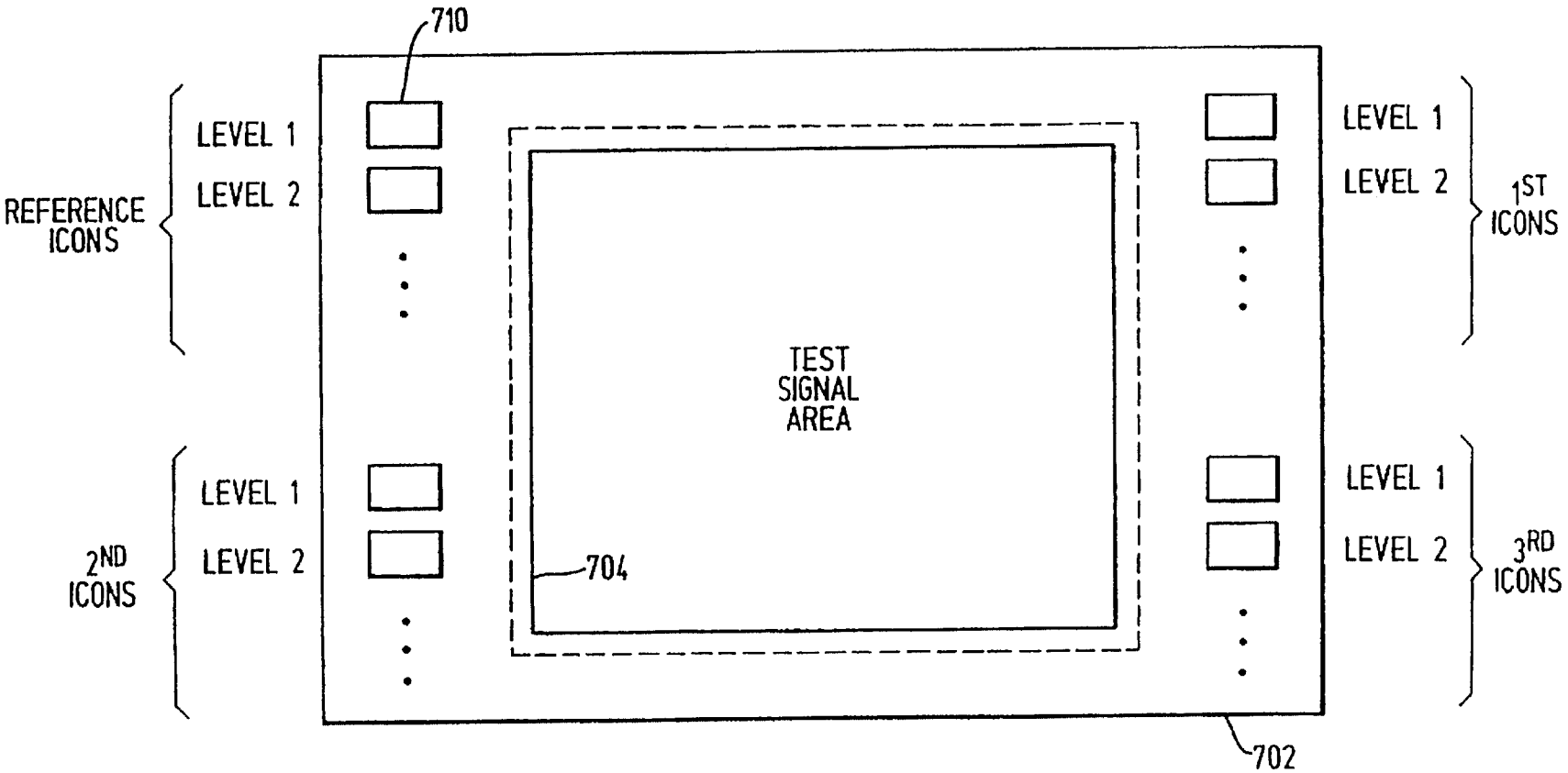
FIG. 7 is a pictorial view, similar to that of FIG. 4, illustrating a further implementation of the invention.

An embodiment of a probe frame created according to the invention is illustrated in FIG. 7. This illustration is similar to that of FIG. 4. FIG. 7 shows an active picture window 702 containing a test signal area 704 which is comparable to the safe title area of FIG. 4. Between the boundaries of active picture window 702 and test signal area 704 there is disposed an array of icons 710 arranged in four groups: reference icons; first icons; second icons; and third icons. Each group contains a vertical row of icons belonging to icon levels 1, 2 . . . respectively. When each icon 710 has a vertical extent of twelve picture lines in a frame, each group can contain up to sixteen icons.

Thus, each level is compared of a reference icon and respective first, second and third icons. The icons of each level may be read in the manner described earlier herein, using a respective set of gates and comparison patterns for the icons of each level. Arrays of icons will be provided in successive video frames, like the single set of icons described earlier herein.

The icons of each level may contain a particular type of information. For example, level 1 may be composed of a specially defined, reserved icon pattern set which is used to identify the probe frame, i.e. to indicate to the system that the frame containing this icon pattern set at the level 1 locations is a probe frame.

The level 2 icons could contain information identifying the location of the node from which the probe frame data is being sent, the level 3 icons could contain information identifying the node which is the intended destination of the probe frame data and level 4 icons could contain information identifying the last node tested. Levels 5 through 16 could each contain another type of information. Other types of information could include the condition of the signal at the last node capable of rewriting the icons.

The present invention offers the capability of readily identifying any individual video frame in real time, i.e. substantially contemporaneously with passage of that frame through a node in a video system. This opens the possibility of using icons according to the invention to identify key frames. Key frames are video frames which uniquely identify the content of program material from which they are extracted. Key frames may also be identified as video identification frames. For example, a suitably selected set of icon patterns could be added to a frame which displays a slate employed to indicate the beginning of a scene during taping, or to the first and/or last frame of a particular scene or segment.

A frame which is identified on the basis of such icon patterns can be compressed and stored in a computer as additional program documentation.

For example, at any point in the production or transmission of a video program, scene, segment, etc., a desired pattern of icons can be added to a selected frame. Then, that frame can be digitized, using a JPEG or MPEG standard, or any other digitization method, to form a reduced digital image which includes the icons and the digital image can then be stored on disk in a computer. The digital image could be one which would be reproduced to a size of, for example, the order of 3 inches by 4 inches on a 15 inch computer screen.

Thus, while it is not practical to store complete NTSC frames in business documents in a computer, it is practical to store such compressed video images as part of such a document. The possibility of reading icon patterns on a frame-by-frame basis in real time makes the above-described procedure feasible.

A multi-level icon pattern as illustrated in FIG. 7 could also be utilized with video program and program segments which would be displayed in the manner described with respect to FIG. 4.

Whether the signals being transferred from one installation or device to another consist of video signal programs, program segments, or test signals, one feature of the present invention resides in the positioning of the icons outside of the normal viewing area of a home receiver, i.e., outside of safe title border 408, and preferably outside of safe action border 406 in FIG. 4, or outside of test signal area 704 of FIG. 7. These icons can, however, be observed on a professional studio monitor or on a home receiver whose picture width control is incorrectly adjusted. Therefore, it will, under certain circumstances, be desirable to add the icons to a video signal in such a manner that the icons will be virtually invisible on a home receiver having an incorrectly adjusted picture width control.

Simply stated, this can be accomplished by displaying icons at each icon location only in video frames which do not immediately succeed one another, i.e., which are separated from one another by intervening video frames.

By way of example, if each group of icons shown in FIG. 7 is constituted by 16 icon levels, each icon level can be included in a respective one of 16 successive video frames. Thus, for example, in a first frame only the level 1 icons would be included in the video signal, in the next succeeding frame only the level 2 icons would be included in the video signal, in the next succeeding frame only the level 3 icons would be included in the video signal, and so on until the level 16 icons are included in the video signal in the 16th successive frame. Of course, other patterns are possible. To cite several non-limiting examples, icons of levels 1, 5, 9 and 13 could be included in a first frame, icons of levels 2, 6, 10 and 14 would be included in the next succeeding frame, etc. In this case, an icon would appear at each icon location only once in every four frames.

The light output from each icon is small due to its relatively small size in a television picture and would be noticeable by a viewer only if repeated at the same icon location in contiguous, or immediately succeeding, video frames. Therefore, by providing an icon at any one location in video frames which are separated by intervening video frames in which an icon does not appear at that position, the average icon light output from a particular icon location will be reduced to a level which is virtually undetectable by a viewer. By displaying icons at each level in a discontinuous manner, any distracting influence of the icons on the viewer is avoided, while technical personnel retain the ability to interpret the icons by viewing a video tape or video file server on a frame-by-frame basis.

To produce the above-described icon pattern, it is only necessary to provide suitable programming for microprocessor 330 of FIGS. 3A–3D.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. Apparatus for tracking the flow of television programs within a program distribution system, each program including a video signal which contains information to generate a television picture composed of successive television picture frames, the distribution system including a plurality of units through which the television programs flow, said apparatus comprising:

first signal processing means connected within the system for adding signal elements to the video signal of a program in order to add a plurality of patterns of machine readable symbols to a plurality of frames of the television picture such that each of the symbols is disposed substantially at a respective one of a plurality of predetermined locations of a respective frame of the television picture, wherein the plurality of predetermined locations are composed of a reference location and a plurality of information locations, and symbols at the information locations contain information specific to the programs; and second signal processing means connected within the system for detecting signal elements previously added to a video signal at the information locations of each frame when a given symbol is present at the reference location of that frame and for retrieving, in response to such detection, the information contained in the symbols, wherein in each frame containing symbols, the information locations have fixed positions relative to the reference location, and said second signal processing means comprise reference position location means for detecting signal elements previously added to the video signal at the reference location and for determining the present location of those signal elements in each frame.

2. Apparatus as defined in claim 1 wherein said second signal processing means further comprise means for identifying the present location of signal elements previously added to a video signal at information locations of a frame based on the determination of the present location of the signal elements added to the reference location of the frame.

3. Apparatus as defined in claim 2 wherein the signal elements added to the video signal form a predetermined pattern at the reference location of each of the plurality of frames.

4. Apparatus for tracking the flow of television programs within a program distribution system, each program including a video signal which has at least one reference intensity level and which contains information to generate a television picture composed of lines of pixels forming successive television picture frames, each pixel having an intensity level, the distribution system including a plurality of units through which the television programs flow, said apparatus comprising:

first signal processing means connected within the system for adding signal elements to the video signal of a program in order to add a plurality of patterns of pixels constituting machine readable symbols to a plurality of frames of the television picture such that each of the nonbinary graphic symbols is disposed at a respective one of a plurality of predetermined locations of a respective frame of the television picture, wherein the plurality of predetermined locations include a reference location and at least one information location, and the symbol at the at least one information location contains information specific to the program, the symbol at each predetermined location of each of the plurality of frames being constituted by a predetermined pattern of pixels, each pixel having one of at least two predetermined different intensity levels and each of the two different intensity levels bearing a fixed relation to the at least one reference intensity level; and second signal processing means connected within the system for detecting signal elements previously added to a video signal at the at least one information location of each frame and for retrieving, in response to such detection, the information contained in the symbols, wherein said second signal processing means comprise intensity level detection means for detecting the intensity levels of the pixels of the symbol at the reference location of each of the plurality of frames.

5. Apparatus as defined in claim 4 wherein said second signal processing means further comprise second detection means for detecting signal elements previously added to the video signal at the at least one information location of each frame with respect to the intensity levels determined by said intensity level detection means.

6. Apparatus as defined in claim 4 wherein, said first signal processing means are disposed at a first location; said second signal processing means are disposed at a second location remote from said first location; and said apparatus further comprises video signal level adjustment means coupled to said intensity level detection means for adjusting the video signal in order to eliminate any difference between the predetermined intensity levels and the intensity levels detected by said intensity level detection means.

7. A device for use with a television receiver which is tunable to a plurality of channels, each channel carrying a television program composed of a video signal that includes signal elements which form machine readable symbols identifying the program, said device comprising:

video signal receiving means connected to the receiver to receive the program on the channel to which the receiver is tuned;

decoding means connected to said video signal receiving means for reading the symbols and generating an identification of the program which contains the symbols;

clock means providing an indication of the current time; and recording means for storing a record of programs which contained symbols read by said decoding means and the time of each reading;

wherein said video signal receiving means comprise symbol erasing means connected for processing the video signal of the program on the channel to which the receiver is tuned in order to replace the signal elements corresponding to the symbols with replacement signal elements which produce picture regions that blend with adjacent picture regions.

8. A device for use with a television receiver which is tunable to a plurality of channels, each channel carrying a television program composed of a video signal that includes signal elements which form machine readable symbols identifying the program, said device comprising:

video signal receiving means connected to the receiver to receive the program on the channel to which the receiver is tuned;

decoding means connected to said video signal receiving means for reading the symbols and generating an identification of the program which contains the symbols;

clock means providing an indication of the current time; and transmitting means connected to said decoding means and said clock means for transmitting, to a central station remote from the television receiver, data corresponding to the identification generated by said decoding means and data representing the indication provided by said clock means, wherein wherein said video signal receiving means comprise symbol erasing means connected for processing the video signal of the program on the channel to which the receiver is tuned in order to replace the signal elements corresponding to the symbols with replacement signal elements which produce picture regions that blend with adjacent picture regions.

9. A device as defined in claim 8 wherein said transmitting means are connected to the central station via a telephone system.

10. Apparatus for tracking the flow of television programs within a program distribution system, each program including a video signal which contains information to generate a television picture composed of successive television picture frames, the distribution system including a plurality of units through which the television programs flow, said apparatus comprising:

first signal processing means connected within the system for adding, to the video signal of a program, signal elements which form a plurality of sets of patterns of machine readable symbols in a plurality of frames of the television picture such that each set of patterns is added to a respective video frame, each set is composed of a plurality of patterns of the symbols, the symbols of each plurality of patterns are disposed at respective ones of a plurality of predetermined locations of a respective frame of the television picture, the symbols of each pattern are spaced from the symbols of every other pattern, and the symbols of each pattern contain a respective type of information associated with the program; and second signal processing means connected within the system for detecting signal elements previously added to a video signal at the predetermined locations of each frame and for retrieving, in response to such detection, the information contained in the symbols.

11. Apparatus as defined in claim 10 wherein, in each frame of the plurality of frames, the predetermined locations are arranged in a plurality of groups of predetermined locations, with the groups of predetermined locations being spaced from one another, and each group of predetermined locations containing a respective one of the plurality of patterns of symbols.

12. Apparatus as defined in claim 11 wherein, in each frame of the plurality of frames, said predetermined locations of each group of locations are arranged in a vertical row.

13. Apparatus as defined in claim 10 wherein said first signal processing means are controlled to add each set of patterns only to video frames which are separated from one another by intervening video frames.

14. Apparatus as defined in claim 13 wherein said first signal processing means are operative for adding only one set of patterns to any one video frame.

15. Apparatus for tracking the flow of television programs within a program distribution system, each program including a video signal which contains information to generate a television picture composed of a succession of video frames, the distribution system including a plurality of units through which the television programs flow, said apparatus comprising:

first signal processing means connected within the system for adding, to the video signal of a program, signal elements which form a plurality of patterns of nonbinary graphic symbols in a plurality of video frames of the television picture such that each pattern is added to a respective video frame and is composed of a plurality of nonbinary graphic symbols which are spaced apart from one another in the video frame and are disposed at predetermined locations of the video frame, and a plurality of successive patterns constitute a code uniquely identifying the program; and second signal processing means connected within the system for detecting signal elements previously added to the video signal and for producing, in response to such detection, an identification of the program which included the video signal.

16. A method for tracking the flow of television programs within a program distribution system, each program including a video signal which contains information to generate a television picture composed of a succession of video frames, the distribution system including a plurality of units through which the television programs flow, said method comprising:

adding to the video signal of a program, in first signal processing means connected within the system, signal elements which form a plurality of patterns of nonbinary graphic symbols in a plurality of video frames of the television picture such that each pattern is added to a respective video frame and is composed of a plurality of nonbinary graphic symbols which are spaced apart from one another in the video frame and are disposed at predetermined locations of the video frame, and a plurality of successive patterns constitute a code uniquely identifying the program; and detecting, in second signal processing means connected within the system, signal elements previously added to the video signal and producing, in response to such detection, an identification of the program which included the video signal.

17. A control apparatus for use in connection with one or more slave units and a video signal having signal elements representing icons, wherein the video signal contains information to generate a television picture composed of successive television picture frames, a plurality of the television picture frames each contains a plurality of icons which are spaced apart in the television picture frame and each icon is a nonbinary graphic symbol, said apparatus comprising:

means for reading the icons of the video signal; and means for controlling a slave unit in response to the icons read from the video signal, and wherein the slave unit is a router and the controlling means has means for activating the router to route the video signal in accordance with the icons read from the video signal.

18. A control apparatus for use in connection with one or more slave units and a video signal having signal elements representing icons, wherein the video signal contains information to generate a television picture composed of successive television picture frames, a plurality of the television picture frames each contains a plurality of icons which are spaced apart in the television picture frame and each icon is a nonbinary graphic symbol, said apparatus comprising:

means for reading the icons of the video signal; and means for controlling a slave unit in response to the icons read from the video signal, and wherein the slave unit comprises automatic commercial insertion equipment and the controlling means has means for activating the insertion equipment to insert a commercial into the video signal in response to the icons read from the video signal.

19. A control apparatus for use in connection with one or more slave units and a video signal having signal elements representing icons, wherein the video signal contains information to generate a television picture composed of successive television picture frames, a plurality of the television pictures frames each contains a plurality of icons which are spaced apart in the *margin of the* television picture frame *outside of the safe title area of said picture frame* and each icon is a nonbinary graphic symbol, said apparatus comprising:

means for reading the icons of the video signal; and means for controlling a slave unit in response to the icons read from the video signal, and wherein the slave unit comprises a video file server.

20. A control apparatus for use in connection with one or more slave units and a video signal having signal elements representing icons, wherein the video signal contains information to generate a television picture composed of successive television picture frames, a plurality of the television picture frames each contains a plurality of icons which are spaced apart in the *margin of the* television picture frame *outside of the safe title area of said picture frame* and each icon is a nonbinary graphic symbol, said apparatus comprising:

means for reading the icons of the video signal; and means for controlling a slave unit in response to the icons read from the video signal, and wherein each icon is a picture of a graphic symbol comprising a plurality of pixels of different colors.

21. The apparatus of claim 20 wherein at least one icon is a reference icon which provides reference levels for different colors of the icons.

22. The apparatus of claim 20 wherein the icon colors include white, gray and black.

*23. An information distribution system for distributing information to a plurality of television receivers by way of video signals, said system comprising, in combination,*

*an encoder for inserting into at least one frame of said video signals at least one code signal representing said information, and locating said code signal in said video signals so that the code signal creates at least one corresponding visible picture element in the active picture area of a picture displayed on a receiver of said signals, said picture element being positioned within the margin of said picture outside of the visible portion of said picture so as to be substantially invisible to the viewer,*

*transmitting equipment for transmitting from a transmitting station television video signals including said code signal,*

*a plurality of receivers located remotely from said transmitting station and tunable to receive said video signals, and*

*a decoder associated with each of said receivers for decoding said code signal and providing a corresponding information signal.*

*24. A system as in claim 23 in which said encoder is adapted to insert a plurality of said code signals into a plurality of fields of said video signal, in which code signals produce a plurality of corresponding visible picture elements forming at least one visible icon extending over a plurality of horizontal lines and with multiple picture elements in each line forming a sequence, said icon being located entirely in the margins of said picture outside of the normal viewing area of said picture so that, said icon is substantially invisible to the viewer.*

*25. A system as in claim 23 in which said picture element includes a plurality of horizontal lines each made of individual picture elements variable in video signal characteristics along the length of each line to give said picture element a horizontally and vertically variable coded pattern.*

*26. A system as in claim 25 in which said encoder is adapted to give said picture element one of a plurality of different predetermined patterns.*

*27. A remote signaling system for sending from a first location to a remote location a coded signal embedded within video signals and for decoding said coded signal at said remote location, said system comprising a transmitter at said first location, an encoder for inserting a code signal into said video signals adjacent said transmitter, and thereby creating a corresponding picture element located in a margin of the video picture and dimensioned to be outside of the visible picture area and thus be substantially invisible in a video picture produced when said video signals are displayed on a receiver of said video signals, and*

*at least one decoder at said remote location for decoding said coded signal and producing a corresponding signal,*

*said picture element including a plurality of horizontal line segments variable in video signal characteristics along its length to provide a predetermined coded pattern.*

*28. A system as in claim 27 in which said signal characteristics include gray level.*

*29. A method for distributing information to a plurality of television receivers by way of video signals, said method comprising the steps of:*

*(a) transmitting from a first location video signals containing at least one code signal representing said information and locating said code signal in said video signals so that the code signal creates a corresponding visible picture element in a picture displayed on a receiver of said video signals, with the picture element being located in the margin of said picture so as to be substantially invisible to the viewer,*

*(b) receiving said video signals in a plurality of receivers located remotely from said first location, said receivers being tunable to receive said video signals, and*

*(c) providing a decoder associated with each of said receivers for decoding said code signal and producing a corresponding information signal.*

*30. A method as in claim 29 in which said picture element comprises an array consisting of a plurality of horizontal line segments each having characteristics which can be varied along its length, and including the step of encoding said code signal to give said picture element one of a predetermined group of patterns.*

*31. A method of deleting a coded picture element from video picture signals, said coded picture element being positioned within the active picture area of a video screen, but being located outside of the picture area visible on a receiver screen and within a marginal area of said screen so as to be substantially invisible to a viewer, said method comprising replacing at least a portion of the coded picture element video signals with other video signals.*

*32. A method as in claim 31 in which said replacing step comprises replacing said coded picture element video signals with signals corresponding essentially to the video picture signals.*

*33. A method as in claim 32 in which said coded picture element is replaced by delaying one of an interleaved field or other frame of said video picture signals.*

*34. A method of controlling the transmission of video signals representing at least one icon in a video transmission system, said icon containing coded information which can be read by a decoder and appearing within the active picture area but outside of the picture area visible to a viewer of a receiver screen but within a picture margin where it is substantially invisible when displayed on a video screen, said method comprising the step of deleting at least a portion of said icon prior to transmission of said video signals to a remote video receiving location.*

*35. A method as in claim 34 in which the deleting step is performed prior to sending the video signals into a cable distribution system.*

*36. A method as in claim 34 in which the deleting step is performed prior to broadcasting said video signals.*

*37. A method as in claim 34 in which the deleting step comprises replacing at least a portion of the video signals forming said icon with other video signals.*

* * * * *